United States Patent
Zhang et al.

(10) Patent No.: US 11,121,743 B2
(45) Date of Patent: Sep. 14, 2021

(54) SYSTEM AND METHOD FOR PHASE NOISE COMPENSATION

(71) Applicant: Apple Inc., Cupertino, CA (US)

(72) Inventors: Yushu Zhang, Beijing (CN); Alexei Davydov, Nizhny Novgorod (RU); Wook Bong Lee, San Jose, CA (US); Gang Xiong, Portland, OR (US); Xinyue Zheng, Beijing (CN)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/500,937

(22) PCT Filed: May 4, 2018

(86) PCT No.: PCT/US2018/031045
§ 371 (c)(1),
(2) Date: Oct. 4, 2019

(87) PCT Pub. No.: WO2018/204756
PCT Pub. Date: Nov. 8, 2018

(65) Prior Publication Data
US 2020/0052740 A1  Feb. 13, 2020

Related U.S. Application Data

(60) Provisional application No. 62/501,622, filed on May 4, 2017.

(30) Foreign Application Priority Data

May 4, 2020 (WO) ................ PCT/CN2017/083009

(51) Int. Cl.
*H04K 1/10* (2006.01)
*H04L 27/28* (2006.01)
(Continued)

(52) U.S. Cl.
CPC ........... *H04B 7/02* (2013.01); *H04B 10/6165* (2013.01); *H04L 5/0048* (2013.01); *H02J 7/00* (2013.01)

(58) Field of Classification Search
CPC ..... H04B 7/02; H04B 10/6165; H04L 5/0048; H02J 7/00
(Continued)

(56) References Cited

U.S. PATENT DOCUMENTS

2019/0312697 A1* 10/2019 Li ............................. H04L 5/00
2020/0259609 A1* 8/2020 Saito ..................... H04L 5/0048

OTHER PUBLICATIONS

International Preliminary Report on Patentability dated Nov. 5, 2019 for International Application No. PCT/US2018/031045.
(Continued)

*Primary Examiner* — Phuong Phu
(74) *Attorney, Agent, or Firm* — Eschweiler & Potashnik, LLC

(57) ABSTRACT

An apparatus is configured to be employed within a base station. The apparatus comprises baseband circuitry which includes a radio frequency (RF) interface and one or more processors. The one or more processors are configured to arrange phase tracking reference signal (PT-RS) resource elements (REs) and data REs as an arrangement for a transmission based on one or more diversity factors. The one or more diversity factors include a time domain and a frequency domain. The one or more processors are also configured to provide the transmission having the PT-RS REs to the RF interface for transmission to a user equipment (UE) device.

18 Claims, 13 Drawing Sheets

(51) Int. Cl.
  *H04B 7/02* (2018.01)
  *H04B 10/61* (2013.01)
  *H04L 5/00* (2006.01)
  *H02J 7/00* (2006.01)

(58) Field of Classification Search
  USPC .................................... 375/260, 316, 346
  See application file for complete search history.

(56) References Cited

OTHER PUBLICATIONS

International Search Report dated Aug. 13, 2018 for International Application No. PCT/US2018/031045.
"Discussion on Common Phase Error Compensation for Above 6GHz." Source: LG Electronics. Agenda Item: 8.1.4.4. 3GPP TSG RAN WG1 Meeting #86bis, Lisbon, Portugal Oct. 10-14, 2016, R1-1609261.
Verizon 5G TF; Air Interface Working Group; Verizon 5th Generation Radio Access; Physical channels and modulation (Release 1). Cisco, Ericcson, Intel Corp., LG Electronics, Nokia, Qualcomm Technolgoies Inc., Samsung Electornics & Verizon. V 1.3. 2016.
"On PT-RS Design for NR." Source: Nokia, Alcatel-Lucent Shanghai Bell. Agenda Item: 8.1.2.4.3. 3GPP TSG RAN WG1#88, Athens, Greece, Feb. 13-17, 2017. R1-1703182.

\* cited by examiner

DFT-s-OFDM WAVEFORM
USING PUNCTURING

DFT-s-OFDM WAVEFORM
USING FDM multiplexing of PUSCH
and PT-RS

1000b

|  | Symbol *l* | Symbol *l+1* |
|---|---|---|
| AP 0 | $S_0$ | $-S_1^*$ |
| AP 1 | $S_1$ | $S_0^*$ |

1100

SYSTEM AND METHOD FOR PHASE NOISE COMPENSATION

REFERENCE TO RELATED APPLICATIONS

This application is a National Phase entry application of International Patent Application No. PCT/US2018/031045 filed May 4, 2018, which is a continuation of International Application PCT/CN2017/083009, filed on May 4, 2017 and entitled "PHASE NOISE COMPENSATION FOR DIVERSITY BASED TRANSMISSION" and claims the benefit of U.S. Provisional Application No. 62/501,622, filed May 4, 2017, entitled "SYSTEM AND METHOD FOR CONFIGURABLE ORPHAN RESOURCE ELEMENTS HANDLING", and is hereby incorporated by reference in its entirety.

FIELD

Various embodiments generally relate to the field of wireless communications.

BACKGROUND

Wireless or mobile communication involves wireless communication between two or more devices. The communication requires resources to transmit data from one device to another and/or to receive data at one device from another.

The transmissions typically include a wanted signal and an unwanted signal. The unwanted signal is noise. The noise can be interference, other signals, and the like.

The noise interferes with and/or detracts from the wanted signal. In some examples, the noise can block out the wanted signal. In other examples, the noise degrades the wanted signal.

This interference can impact reliability, throughput, utilization of resources and the like for wireless communications.

What are needed are techniques to mitigate the noise and/or impact of noise for wireless communication systems.

DETAILED DESCRIPTION

Figure 1:
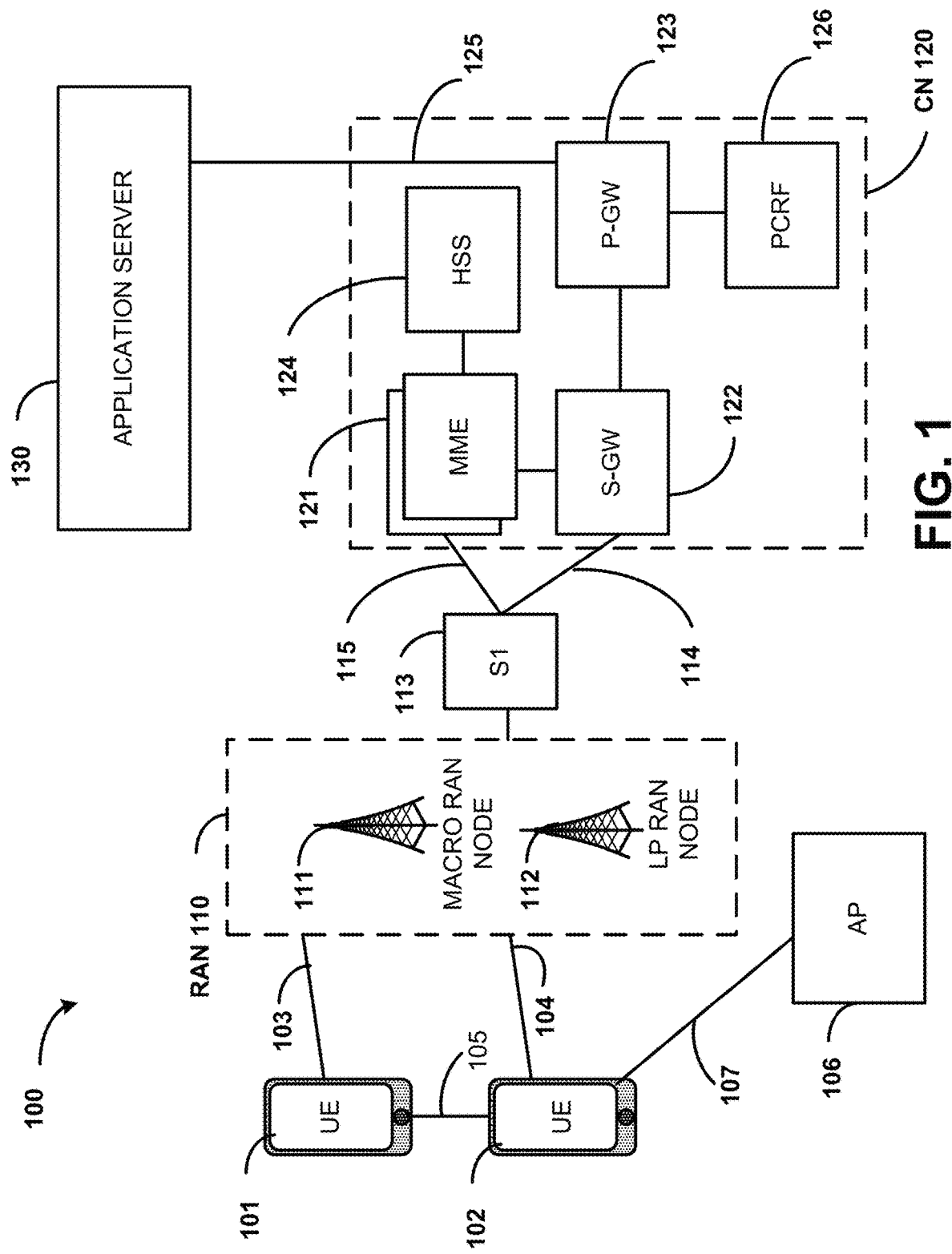
FIG. 1 illustrates a block diagram of an example wireless communications network environment for a network device (e.g., a UE, gNB or an eNB) according to various aspects or embodiments.

The present disclosure will now be described with reference to the attached drawing figures, wherein like reference numerals are used to refer to like elements throughout, and wherein the illustrated structures and devices are not necessarily drawn to scale. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail. Embodiments herein may be related to RAN1 and 5G.

As utilized herein, terms "component," "system," "interface," and the like are intended to refer to a computer-related entity, hardware, software (e.g., in execution), and/or firmware. For example, a component can be a processor, a process running on a processor, a controller, an object, an executable, a program, a storage device, and/or a computer with a processing device. By way of illustration, an application running on a server and the server can also be a component. One or more components can reside within a process, and a component can be localized on one computer and/or distributed between two or more computers. A set of elements or a set of other components can be described herein, in which the term "set" can be interpreted as "one or more."

Further, these components can execute from various computer readable storage media having various data structures stored thereon such as with a module, for example. The components can communicate via local and/or remote processes such as in accordance with a signal having one or more data packets (e.g., data from one component interacting with another component in a local system, distributed system, and/or across a network, such as, the Internet, a local area network, a wide area network, or similar network with other systems via the signal).

As another example, a component can be an apparatus with specific functionality provided by mechanical parts operated by electric or electronic circuitry, in which the electric or electronic circuitry can be operated by a software application or a firmware application executed by one or more processors. The one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components.

Use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. Furthermore, to the extent that the terms "including", "includes", "having", "has", "with", or variants thereof are used in either the detailed description and the claims, such terms are intended to be inclusive in a manner similar to the term "comprising".

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

It is appreciated that there is a continuing need to improve data rates, reliability and performance. These techniques include phase noise compensation, including phase noise compensation for diversity based communications.

Wireless communication systems can involve nodes, such as a base station, communicating with devices, such as user equipment (UE) devices. The nodes can also include evolved Node Bs (eNBs), gNBs, and the like. The systems utilize downlink (DL) communications/transmissions from the base stations to the UE devices and uplink (UL) communications/transmissions from the UE devices to the base stations. Various techniques and schemes can be used for uplink and downlink communications.

The transmissions or communications typically include a wanted signal and an unwanted signal. The unwanted signal is noise, which can be from interference, blocking, other signals, and the like. The noise interferes with and/or detracts from the wanted signal. In some examples, the noise can block out the wanted signal. In other examples, the noise degrades the wanted signal.

One type of noise that is particularly problematic is phase noise. Phase noise is a frequency domain representation of rapid, short-term, random fluctuations in the phase of a waveform.

For an example multiple input multiple output (MIMO) wireless communication system operating in high band (>6 GHz), the phase noise impact could be significant. This phase noise could result in a common phase error (CPE) for some or all subcarriers in one symbol. Additionally, at least some performance degradation could be observed at high modulation orders, e.g. 16 QAM and 64 QAM.

A Phase Tracking Reference Signal (PT-RS) can be used within a system to compensate for phase noise.

There are generally two general types of PT-RS transmission schemes/techniques: one is multiplexed with data in Frequency Division Multiplexing (FDM) manner and the other is multiplexed with data in Time Division Multiplexing (TDM) manner. For a cyclic prefix-orthogonal frequency division multiplexing (CP-OFDM) technique, the FDM based multiplexing scheme can be better suited. For a discrete Fourier transform spreading orthogonal frequency division multiplexing (DFT-s-OFDM) technique, if the PT-RS is transmitted before DFT, it can be considered as TDM based multiplexing. If the PT-RS is transmitted after DFT, it can be considered as FDM based multiplexing.

Embodiments are disclosed that facilitate use of the PT-RS with communication systems. The embodiments include techniques to transmit the PT-RS as well as control signaling to support transmit diversity. The techniques include PT-RS transmission in TDM manner and PT-RS transmission in an FDM manner.

Embodiments are also disclosed that mitigate orphan resource elements (REs) and/or associated resources. The embodiments include techniques to determine an orphan type for a transmission, select an option to mitigate orphan REs and/or associated resources, and use the selected option to arrange the transmission.

FIG. 1 illustrates an architecture of a system 100 of a network in accordance with some embodiments. The system 100 is shown to include a user equipment (UE) 101 and a UE 102. The UEs 101 and 102 are illustrated as smartphones (e.g., handheld touchscreen mobile computing devices connectable to one or more cellular networks), but can also comprise any mobile or non-mobile computing device, such as Personal Data Assistants (PDAs), pagers, laptop computers, desktop computers, wireless handsets, or any computing device including a wireless communications interface.

In some embodiments, any of the UEs 101 and 102 can comprise an Internet of Things (IoT) UE, which can comprise a network access layer designed for low-power IoT applications utilizing short-lived UE connections. An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data can be a machine-initiated exchange of data. An IoT network describes interconnecting IoT UEs, which can include uniquely identifiable embedded computing devices (within the Internet infrastructure), with short-lived connections. The IoT UEs can execute background applications (e.g., keep-alive messages, status updates, etc.) to facilitate the connections of the IoT network.

The UEs 101 and 102 can be configured to connect, e.g., communicatively couple, with a radio access network (RAN) 110—the RAN 110 can be, for example, an Evolved Universal Mobile Telecommunications System (UMTS) Terrestrial Radio Access Network (E-UTRAN), a NextGen RAN (NG RAN), or some other type of RAN. The UEs 101 and 102 utilize connections 103 and 104, respectively, each of which comprises a physical communications interface or layer (discussed in further detail below); in this example, the connections 103 and 104 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

In this embodiment, the UEs 101 and 102 can further directly exchange communication data via a ProSe interface 105. The ProSe interface 105 can alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 102 is shown to be configured to access an access point (AP) 106 via connection 107. The connection 107 can comprise a local wireless connection, such as a connection consistent with any IEEE 802.11 protocol, wherein the AP 106 would comprise a wireless fidelity (WiFi®) router. In this example, the AP 106 is shown to be connected to the Internet without connecting to the core network of the wireless system (described in further detail below).

The RAN 110 can include one or more access nodes that enable the connections 103 and 104. These access nodes (ANs) can be referred to as base stations (BSs), NodeBs, evolved NodeBs (eNBs), next Generation NodeBs (gNB), RAN nodes, and so forth, and can comprise ground stations (e.g., terrestrial access points) or satellite stations providing coverage within a geographic area (e.g., a cell). A network device as referred to herein can include any one of these APs, ANs, UEs or any other network component. The RAN 110 can include one or more RAN nodes for providing macrocells, e.g., macro RAN node 111, and one or more RAN nodes for providing femtocells or picocells (e.g., cells having smaller coverage areas, smaller user capacity, or higher bandwidth compared to macrocells), e.g., low power (LP) RAN node 112.

Any of the RAN nodes 111 and 112 can terminate the air interface protocol and can be the first point of contact for the UEs 101 and 102. In some embodiments, any of the RAN nodes 111 and 112 can fulfill various logical functions for the RAN 110 including, but not limited to, radio network controller (RNC) functions such as radio bearer management, uplink (UL) and downlink (DL) dynamic radio resource management and data packet scheduling, and mobility management.

In accordance with some embodiments, the UEs 101 and 102 can be configured to communicate using Orthogonal Frequency-Division Multiplexing (OFDM) communication signals with each other or with any of the RAN nodes 111 and 112 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 111 and 112 to the UEs 101 and 102, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this can represent the smallest quantity of resources that currently can be allocated. There are several different physical downlink channels that are conveyed using such resource blocks.

The physical downlink shared channel (PDSCH) can carry user data and higher-layer signaling to the UEs 101 and 102. The physical downlink control channel (PDCCH) can carry information about the transport format and resource allocations related to the PDSCH channel, among other things. It is appreciated that an MTC physical downlink control channel (MPDCCH) and/or an enhanced physical downlink control channel (EPDCCH) can be used in placed of the PDCCH. The It can also inform the UEs 101 and 102 about the transport format, resource allocation, and H-ARQ (Hybrid Automatic Repeat Request) information related to the uplink shared channel. Typically, downlink scheduling (assigning control and shared channel resource blocks to the UE 102 within a cell) can be performed at any of the RAN nodes 111 and 112 based on channel quality information fed back from any of the UEs 101 and 102. The downlink resource assignment information can be sent on the PDCCH used for (e.g., assigned to) each of the UEs 101 and 102.

The PDCCH can use control channel elements (CCEs) to convey the control information. Before being mapped to resource elements, the PDCCH complex-valued symbols can first be organized into quadruplets, which can then be permuted using a sub-block interleaver for rate matching. Each PDCCH can be transmitted using one or more of these CCEs, where each CCE can correspond to nine sets of four physical resource elements known as resource element groups (REGs). Four Quadrature Phase Shift Keying (QPSK) symbols can be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 8).

Some embodiments can use concepts for resource allocation for control channel information that are an extension of the above-described concepts. For example, some embodiments can utilize an enhanced physical downlink control channel (EPDCCH) that uses PDSCH resources for control information transmission. The EPDCCH can be transmitted using one or more enhanced control channel elements (ECCEs). Similar to above, each ECCE can correspond to nine sets of four physical resource elements known as an enhanced resource element groups (EREGs). An ECCE can have other numbers of EREGs in some situations.

The RAN 110 is shown to be communicatively coupled to a core network (CN) 120—via an S1 interface 113. In embodiments, the CN 120 can be an evolved packet core (EPC) network, a NextGen Packet Core (NPC) network, or some other type of CN. In this embodiment the S1 interface 113 is split into two parts: the S1-U interface 114, which carries traffic data between the RAN nodes 111 and 112 and the serving gateway (S-GW) 122, and the S1-mobility management entity (MME) interface 115, which is a signaling interface between the RAN nodes 111 and 112 and MMEs 121.

In this embodiment, the CN 120 comprises the MMEs 121, the S-GW 122, the Packet Data Network (PDN) Gateway (P-GW) 123, and a home subscriber server (HSS) 124. The MMEs 121 can be similar in function to the control plane of legacy Serving General Packet Radio Service (GPRS) Support Nodes (SGSN). The MMEs 121 can manage mobility aspects in access such as gateway selection and tracking area list management. The HSS 124 can comprise a database for network users, including subscription-related information to support the network entities' handling of communication sessions. The CN 120 can comprise one or several HSSs 124, depending on the number of mobile subscribers, on the capacity of the equipment, on the organization of the network, etc. For example, the HSS 124 can provide support for routing/roaming, authentication, authorization, naming/addressing resolution, location dependencies, etc.

The S-GW 122 can terminate the S1 interface 113 towards the RAN 110, and routes data packets between the RAN 110 and the CN 120. In addition, the S-GW 122 can be a local mobility anchor point for inter-RAN node handovers and also can provide an anchor for inter-3GPP mobility. Other responsibilities can include lawful intercept, charging, and some policy enforcement.

The P-GW 123 can terminate an SGi interface toward a PDN. The P-GW 123 can route data packets between the CN network 120 and external networks such as a network including the application server 130 (alternatively referred to as application function (AF)) via an Internet Protocol (IP) interface 125. Generally, the application server 130 can be an element offering applications that use IP bearer resources with the core network (e.g., UMTS Packet Services (PS) domain, LTE PS data services, etc.). In this embodiment, the P-GW 123 is shown to be communicatively coupled to an application server 130 via an IP communications interface 125. The application server 130 can also be configured to support one or more communication services (e.g., Voice-over-Internet Protocol (VoIP) sessions, PTT sessions, group communication sessions, social networking services, etc.) for the UEs 101 and 102 via the CN 120.

The P-GW 123 can further be a node for policy enforcement and charging data collection. Policy and Charging Enforcement Function (PCRF) 126 is the policy and charging control element of the CN 120. In a non-roaming scenario, there can be a single PCRF in the Home Public Land Mobile Network (HPLMN) associated with a UE's Internet Protocol Connectivity Access Network (IP-CAN) session. In a roaming scenario with local breakout of traffic, there can be two PCRFs associated with a UE's IP-CAN session: a Home PCRF (H-PCRF) within a HPLMN and a Visited PCRF (V-PCRF) within a Visited Public Land Mobile Network (VPLMN). The PCRF 126 can be communicatively coupled to the application server 130 via the P-GW 123. The application server 130 can signal the PCRF 126 to indicate a new service flow and select the appropriate Quality of Service (QoS) and charging parameters. The PCRF 126 can provision this rule into a Policy and Charging Enforcement Function (PCEF) (not shown) with the appropriate traffic flow template (TFT) and QoS class of identifier (QCI), which commences the QoS and charging as specified by the application server 130.

In one or more embodiments, IMS services can be identified more accurately in a paging indication, which can enable the UEs 101, 102 to differentiate between PS paging and IMS service related paging. As a result, the UEs 101, 102 can apply preferential prioritization for IMS services as desired based on any number of requests by any application, background searching (e.g., PLMN searching or the like), process, or communication. In particular, the UEs 101, 102 can differentiate the PS domain paging to more distinguishable categories, so that IMS services can be identified clearly in the UEs 101, 102 in comparison to PS services. In addition to a domain indicator (e.g., PS or CS), a network (e.g., CN 120, RAN 110, AP 106, or combination thereof as an eNB or the other network device) can provide further, more specific information with the TS 36.331-Paging message, such as a "paging cause" parameter. The UE can use this information to decide whether to respond to the paging, possibly interrupting some other procedure like an ongoing PLMN search.

In one example, when UEs 101, 102 can be registered to a visited PLMN (VPLMN) and performing PLMN search (i.e., background scan for a home PLMN (HPLMN) or a higher priority PLMN), or when a registered UE is performing a manual PLMN search, the PLMN search can be interrupted in order to move to a connected mode and respond to a paging operation as part of a MT procedure/operation. Frequently, this paging could be for PS data (non-IMS data), where, for example, an application server 130 in the NW wants to push to the UE 101 or 102 for one of the many different applications running in/on the UE 101 or 102, for example. Even though the PS data could be delay tolerant and less important, in legacy networks the paging is often not able to be ignored completely, as critical services like an IMS call can be the reason for the PS paging. The multiple interruptions of the PLMN search caused by the paging can result in an unpredictable delay of the PLMN search or in the worst case even in a failure of the procedure, resulting in a loss of efficiency in network communication operations. A delay in moving to or handover to a preferred PLMN (via manual PLMN search or HPLMN search) in a roaming condition can incur more roaming charges on a user as well.

Figure 2:
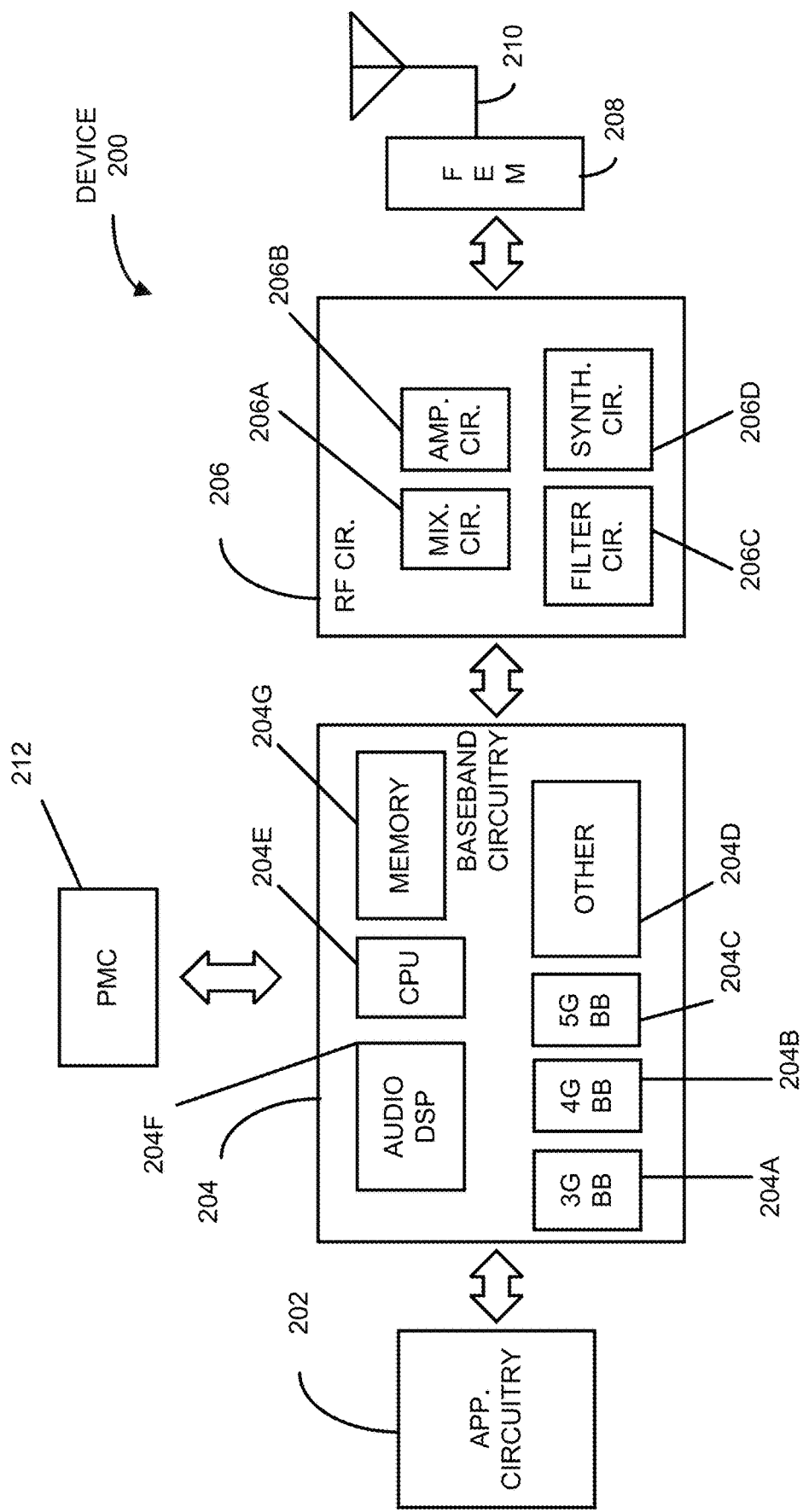
FIG. 2 illustrates another block diagram of an example of wireless communications network environment for a network device (e.g., a UE, gNB or an eNB) according to various aspects or embodiments.

FIG. 2 illustrates example components of a network device 200 in accordance with some embodiments. In some embodiments, the device 200 can include application circuitry 202, baseband circuitry 204, Radio Frequency (RF) circuitry 206, front-end module (FEM) circuitry 208, one or more antennas 210, and power management circuitry (PMC)

212 coupled together at least as shown. The components of the illustrated device 200 can be included in a UE 101, 102 or a RAN node 111, 112, AP, AN, eNB or other network component. In some embodiments, the device 200 can include less elements (e.g., a RAN node can not utilize application circuitry 202, and instead include a processor/controller to process IP data received from an EPC). In some embodiments, the network device 200 can include additional elements such as, for example, memory/storage, display, camera, sensor, or input/output (I/O) interface. In other embodiments, the components described below can be included in more than one device (e.g., said circuitries can be separately included in more than one device for Cloud-RAN (C-RAN) implementations).

The application circuitry 202 can include one or more application processors. For example, the application circuitry 202 can include circuitry such as, but not limited to, one or more single-core or multi-core processors. The processor(s) can include any combination of general-purpose processors and dedicated processors (e.g., graphics processors, application processors, etc.). The processors can be coupled with or can include memory/storage and can be configured to execute instructions stored in the memory/storage to enable various applications or operating systems to run on the device 200. In some embodiments, processors of application circuitry 202 can process IP data packets received from an EPC.

The baseband circuitry 204 can include circuitry such as, but not limited to, one or more single-core or multi-core processors. The baseband circuitry 204 can include one or more baseband processors or control logic to process baseband signals received from a receive signal path of the RF circuitry 206 and to generate baseband signals for a transmit signal path of the RF circuitry 206. Baseband processing circuity 204 can interface with the application circuitry 202 for generation and processing of the baseband signals and for controlling operations of the RF circuitry 206. For example, in some embodiments, the baseband circuitry 204 can include a third generation (3G) baseband processor 204A, a fourth generation (4G) baseband processor 204B, a fifth generation (5G) baseband processor 204C, or other baseband processor(s) 204D for other existing generations, generations in development or to be developed in the future (e.g., second generation (2G), si2h generation (6G), etc.). The baseband circuitry 204 (e.g., one or more of baseband processors 204A-D) can handle various radio control functions that enable communication with one or more radio networks via the RF circuitry 206. In other embodiments, some or all of the functionality of baseband processors 204A-D can be included in modules stored in the memory 204G and executed via a Central Processing Unit (CPU) 204E. The radio control functions can include, but are not limited to, signal modulation/demodulation, encoding/decoding, radio frequency shifting, etc. In some embodiments, modulation/demodulation circuitry of the baseband circuitry 204 can include Fast-Fourier Transform (FFT), precoding, or constellation mapping/demapping functionality. In some embodiments, encoding/decoding circuitry of the baseband circuitry 204 can include convolution, tail-biting convolution, turbo, Viterbi, or Low Density Parity Check (LDPC) encoder/decoder functionality. Embodiments of modulation/demodulation and encoder/decoder functionality are not limited to these examples and can include other suitable functionality in other embodiments.

In some embodiments, the baseband circuitry 204 can include one or more audio digital signal processor(s) (DSP) 204F. The audio DSP(s) 204F can be include elements for compression/decompression and echo cancellation and can include other suitable processing elements in other embodiments. Components of the baseband circuitry can be suitably combined in a single chip, a single chipset, or disposed on a same circuit board in some embodiments. In some embodiments, some or all of the constituent components of the baseband circuitry 204 and the application circuitry 202 can be implemented together such as, for example, on a system on a chip (SOC).

In some embodiments, the baseband circuitry 204 can provide for communication compatible with one or more radio technologies. For example, in some embodiments, the baseband circuitry 204 can support communication with an evolved universal terrestrial radio access network (EU-TRAN) or other wireless metropolitan area networks (WMAN), a wireless local area network (WLAN), a wireless personal area network (WPAN). Embodiments in which the baseband circuitry 204 is configured to support radio communications of more than one wireless protocol can be referred to as multi-mode baseband circuitry.

RF circuitry 206 can enable communication with wireless networks using modulated electromagnetic radiation through a non-solid medium. In various embodiments, the RF circuitry 206 can include switches, filters, amplifiers, etc. to facilitate the communication with the wireless network. RF circuitry 206 can include a receive signal path which can include circuitry to down-convert RF signals received from the FEM circuitry 208 and provide baseband signals to the baseband circuitry 204. RF circuitry 206 can also include a transmit signal path which can include circuitry to up-convert baseband signals provided by the baseband circuitry 204 and provide RF output signals to the FEM circuitry 208 for transmission.

In some embodiments, the receive signal path of the RF circuitry 206 can include mixer circuitry 206a, amplifier circuitry 206b and filter circuitry 206c. In some embodiments, the transmit signal path of the RF circuitry 206 can include filter circuitry 206c and mixer circuitry 206a. RF circuitry 206 can also include synthesizer circuitry 206d for synthesizing a frequency for use by the mixer circuitry 206a of the receive signal path and the transmit signal path. In some embodiments, the mixer circuitry 206a of the receive signal path can be configured to down-convert RF signals received from the FEM circuitry 208 based on the synthesized frequency provided by synthesizer circuitry 206d. The amplifier circuitry 206b can be configured to amplify the down-converted signals and the filter circuitry 206c can be a low-pass filter (LPF) or band-pass filter (BPF) configured to remove unwanted signals from the down-converted signals to generate output baseband signals. Output baseband signals can be provided to the baseband circuitry 204 for further processing. In some embodiments, the output baseband signals can be zero-frequency baseband signals, although this is not a requirement. In some embodiments, mixer circuitry 206a of the receive signal path can comprise passive mixers, although the scope of the embodiments is not limited in this respect.

In some embodiments, the mixer circuitry 206a of the transmit signal path can be configured to up-convert input baseband signals based on the synthesized frequency provided by the synthesizer circuitry 206d to generate RF output signals for the FEM circuitry 208. The baseband signals can be provided by the baseband circuitry 204 and can be filtered by filter circuitry 206c.

In some embodiments, the mixer circuitry 206a of the receive signal path and the mixer circuitry 206a of the transmit signal path can include two or more mixers and can be arranged for quadrature downconversion and upconversion, respectively. In some embodiments, the mixer circuitry 206a of the receive signal path and the mixer circuitry 206a of the transmit signal path can include two or more mixers and can be arranged for image rejection (e.g., Hartley image rejection). In some embodiments, the mixer circuitry 206a of the receive signal path and the mixer circuitry 206a can be arranged for direct downconversion and direct upconversion, respectively. In some embodiments, the mixer circuitry 206a of the receive signal path and the mixer circuitry 206a of the transmit signal path can be configured for superheterodyne operation.

In some embodiments, the output baseband signals and the input baseband signals can be analog baseband signals, although the scope of the embodiments is not limited in this respect. In some alternate embodiments, the output baseband signals and the input baseband signals can be digital baseband signals. In these alternate embodiments, the RF circuitry 206 can include analog-to-digital converter (ADC) and digital-to-analog converter (DAC) circuitry and the baseband circuitry 204 can include a digital baseband interface to communicate with the RF circuitry 206.

In some dual-mode embodiments, a separate radio IC circuitry can be provided for processing signals for each spectrum, although the scope of the embodiments is not limited in this respect.

In some embodiments, the synthesizer circuitry 206d can be a fractional-N synthesizer or a fractional N/N+1 synthesizer, although the scope of the embodiments is not limited in this respect as other types of frequency synthesizers can be suitable. For example, synthesizer circuitry 206d can be a delta-sigma synthesizer, a frequency multiplier, or a synthesizer comprising a phase-locked loop with a frequency divider.

The synthesizer circuitry 206d can be configured to synthesize an output frequency for use by the mixer circuitry 206a of the RF circuitry 206 based on a frequency input and a divider control input. In some embodiments, the synthesizer circuitry 206d can be a fractional N/N+1 synthesizer.

In some embodiments, frequency input can be provided by a voltage controlled oscillator (VCO), although that is not a requirement. Divider control input can be provided by either the baseband circuitry 204 or the applications processor 202 depending on the desired output frequency. In some embodiments, a divider control input (e.g., N) can be determined from a look-up table based on a channel indicated by the applications processor 202.

Synthesizer circuitry 206d of the RF circuitry 206 can include a divider, a delay-locked loop (DLL), a multiplexer and a phase accumulator. In some embodiments, the divider can be a dual modulus divider (DMD) and the phase accumulator can be a digital phase accumulator (DPA). In some embodiments, the DMD can be configured to divide the input signal by either N or N+1 (e.g., based on a carry out) to provide a fractional division ratio. In some example embodiments, the DLL can include a set of cascaded, tunable, delay elements, a phase detector, a charge pump and a D-type flip-flop. In these embodiments, the delay elements can be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 206d can be configured to generate a carrier frequency as the output frequency, while in other embodiments, the output frequency can be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency can be a LO frequency (fLO). In some embodiments, the RF circuitry 206 can include an IQ/polar converter.

FEM circuitry 208 can include a receive signal path which can include circuitry configured to operate on RF signals received from one or more antennas 210, amplify the received signals and provide the amplified versions of the received signals to the RF circuitry 206 for further processing. FEM circuitry 208 can also include a transmit signal path which can include circuitry configured to amplify signals for transmission provided by the RF circuitry 206 for transmission by one or more of the one or more antennas 210. In various embodiments, the amplification through the transmit or receive signal paths can be done solely in the RF circuitry 206, solely in the FEM 208, or in both the RF circuitry 206 and the FEM 208.

In some embodiments, the FEM circuitry 208 can include a TX/RX switch to switch between transmit mode and receive mode operation. The FEM circuitry can include a receive signal path and a transmit signal path. The receive signal path of the FEM circuitry can include an LNA to amplify received RF signals and provide the amplified received RF signals as an output (e.g., to the RF circuitry 206). The transmit signal path of the FEM circuitry 208 can include a power amplifier (PA) to amplify input RF signals (e.g., provided by RF circuitry 206), and one or more filters to generate RF signals for subsequent transmission (e.g., by one or more of the one or more antennas 210).

In some embodiments, the PMC 212 can manage power provided to the baseband circuitry 204. In particular, the PMC 212 can control power-source selection, voltage scaling, battery charging, or DC-to-DC conversion. The PMC 212 can often be included when the device 200 is capable of being powered by a battery, for example, when the device is included in a UE. The PMC 212 can increase the power conversion efficiency while providing desirable implementation size and heat dissipation characteristics.

While FIG. 2 shows the PMC 212 coupled only with the baseband circuitry 204. However, in other embodiments, the PMC 2 12 can be additionally or alternatively coupled with, and perform similar power management operations for, other components such as, but not limited to, application circuitry 202, RF circuitry 206, or FEM 208.

In some embodiments, the PMC 212 can control, or otherwise be part of, various power saving mechanisms of the device 200. For example, if the device 200 is in an RRC_Connected state, where it is still connected to the RAN node as it expects to receive traffic shortly, then it can enter a state known as Discontinuous Reception Mode (DRX) after a period of inactivity. During this state, the device 200 can power down for brief intervals of time and thus save power.

If there is no data traffic activity for an extended period of time, then the device 200 can transition off to an RRC_Idle state, where it disconnects from the network and does not perform operations such as channel quality feedback, handover, etc. The device 200 goes into a very low power state and it performs paging where again it periodically wakes up to listen to the network and then powers down again. The device 200 does not receive data in this state, in order to receive data, it transitions back to RRC_Connected state.

An additional power saving mode can allow a device to be unavailable to the network for periods longer than a paging interval (ranging from seconds to a few hours). During this time, the device can be unreachable to the network and can power down completely. Any data sent during this time can incur a large delay with the delay presumed to be acceptable.

Processors of the application circuitry 202 and processors of the baseband circuitry 204 can be used to execute elements of one or more instances of a protocol stack. For example, processors of the baseband circuitry 204, alone or in combination, can be used execute Layer 3, Layer 2, or Layer 1 functionality, while processors of the application circuitry 204 can utilize data (e.g., packet data) received from these layers and further execute Layer 4 functionality (e.g., transmission communication protocol (TCP) and user datagram protocol (UDP) layers). As referred to herein, Layer 3 can comprise a radio resource control (RRC) layer, described in further detail below. As referred to herein, Layer 2 can comprise a medium access control (MAC) layer, a radio link control (RLC) layer, and a packet data convergence protocol (PDCP) layer, described in further detail below. As referred to herein, Layer 1 can comprise a physical (PHY) layer of a UE/RAN node. Each of these layers can be implemented to operate one or more processes or network operations of embodiments/aspects herein.

In addition, the memory 204G can comprise one or more machine-readable medium/media including instructions that, when performed by a machine or component herein cause the machine to perform acts of the method or of an apparatus or system for concurrent communication using multiple communication technologies according to embodiments and examples described herein. It is to be understood that aspects described herein can be implemented by hardware, software, firmware, or any combination thereof. When implemented in software, functions can be stored on or transmitted over as one or more instructions or code on a computer-readable medium (e.g., the memory described herein or other storage device). Computer-readable media includes both computer storage media and communication media including any medium that facilitates transfer of a computer program from one place to another. A storage media or a computer readable storage device can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or other tangible and/or non-transitory medium, that can be used to carry or store desired information or executable instructions. Also, any connection can also be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then coaxial cable, fiber optic cable, twisted pair, DSL, or wireless technologies such as infrared, radio, and microwave are included in the definition of medium.

In general, there is a move to provide network services for the packet domain. The earlier network services like UMTS or 3G and predecessors (2G) configured a CS domain and a packet domain providing different services, especially CS services in the CS domain as well as voice services were considered to have a higher priority because consumers demanded an immediate response. Based on the domain that the paging was received, the device 200 could assign certain priority for the incoming transaction. Now with LTE/5G most services are moving to the packet domain. Currently, the UE (e.g., 101, 102, or device 200) can get paging for a packet service without knowing any further information about the paging of the MT procedure, such as whether someone is calling on a line, a VoIP call, or just some packet utilized from Facebook, other application service, or other similar MT service. As such, a greater opportunity exists for further delays without the possibility for the UE to discriminate between the different application packets that could initiate a paging and also give a different priority to it based on one or more user preferences. This can could be important for the UE because the UE might be doing other tasks more vital for resource allocation.

In one example, a UE (e.g., 101, 102, or device 200) could be performing a background search for other PLMNs. This is a task the UE device 200 could do in regular intervals if it is not connected on its own home PLMN or a higher priority PLMN, but roaming somewhere else. A higher priority could be a home PLMN or some other PLMNs according to a list provided by the provider or subscriber (e.g., HSS 124). Consequently, if a paging operation arrives as an MT service and an interruption results, such that a start and begin operation are executed, a sufficient frequency of these interruptions could cause the UE to never complete a background search in a reasonable way. This is one way where it would be advantageous for the UE or network device to know that the interruption is only a packet service, with no need to react to it immediately, versus an incoming voice call that takes preference immediately and the background scan should be postponed.

Additionally, the device 200 can be configured to connect or include multiple subscriber identity/identification module (SIM) cards/components, referred to as dual SIM or multi SIM devices. The device 200 can operate with a single transmit and receive component that can coordinate between the different identities from which the SIM components are operating. As such, an incoming voice call should be responded to as fast as possible, while only an incoming packet for an application could be relatively ignored in order to utilize resources for the other identity (e.g., the voice call or SIM component) that is more important or has a higher priority from a priority list/data set/or set of user device preferences, for example. This same scenario can also be utilized for other operations or incoming data, such as with a PLMN background search such as a manual PLMN search, which can last for a long period of time since, especially with a large number of different bands from 2G, etc. With an ever increasing number of bands being utilized in wireless communications, if paging interruptions come in between the operations already running without distinguishing between the various packet and real critical services such as voice, the network devices can interpret this manual PLMN search to serve and ensure against a drop or loss of any increment voice call, with more frequent interruptions in particular.

As stated above, even though in most of these cases the PS data is delay tolerant and less important, in legacy networks the paging cannot be ignored completely, as critical services like an IMS call can be the reason for the PS paging. The multiple interruptions of a PLMN search caused by the paging can result in an unpredictable delay of the PLMN search or in the worst case even in a failure of the procedure. Additionally, a delay in moving to preferred PLMN (via manual PLMN search or HPLMN search) in roaming condition can incur more roaming charges on user. Similarly, in multi-SIM scenario when UE is listening to paging channel of two networks simultaneously and has priority for voice service, a MT IMS voice call can be interpreted as "data" call as indicated in MT paging message and can be preceded by MT Circuit Switched (CS) paging of an other network or MO CS call initiated by user at same time. As such, embodiments/aspects herein can increase the call drop risk significantly for the SIM using IMS voice service.

In embodiments, 3GPP NW can provide further granular information about the kind of service the network is paging for. For example, the Paging cause parameter could indicate one of the following values/classes/categories: 1) IMS voice/video service; 2) IMS SMS service; 3) IMS other services (not voice/video/SMS-related; 4) any IMS service; 5) Other PS service (not IMS-related). In particular, a network device (e.g., an eNB or access point) could only be discriminating between IMS and non-IMS services could use 4) and 5), whereas a network that is able to discriminate between different types of IMS services (like voice/video call, SMS, messaging, etc.) could use 3) instead of 4) to explicitly indicate to the UE that the paging is for an IMS service different from voice/video and SMS. By obtaining this information UE may decide to suspend PLMN search only for critical services like incoming voice/video services.

In other aspects, dependent on the service category (e.g., values or classes 1-5 above), the UE 101, 102, or device 200 can memorize that there was a paging to which it did not respond, and access the network later, when the PLMN search has been completed and the UE decides to stay on the current PLMN. For example, if the reason for the paging was a mobile terminating IMS SMS, the MME can then inform the HSS (e.g., 124) that the UE is reachable again, and the HSS 124 can initiate a signaling procedure which will result in a delivery of the SMS to the UE once resources are more available or less urgent for another operation/application/or category, for example. To this purpose the UE 101, 102, or 200 could initiate a periodic tau area update (TAU) procedure if the service category in the Paging message indicated "IMS SMS service", for example.

Figure 3:
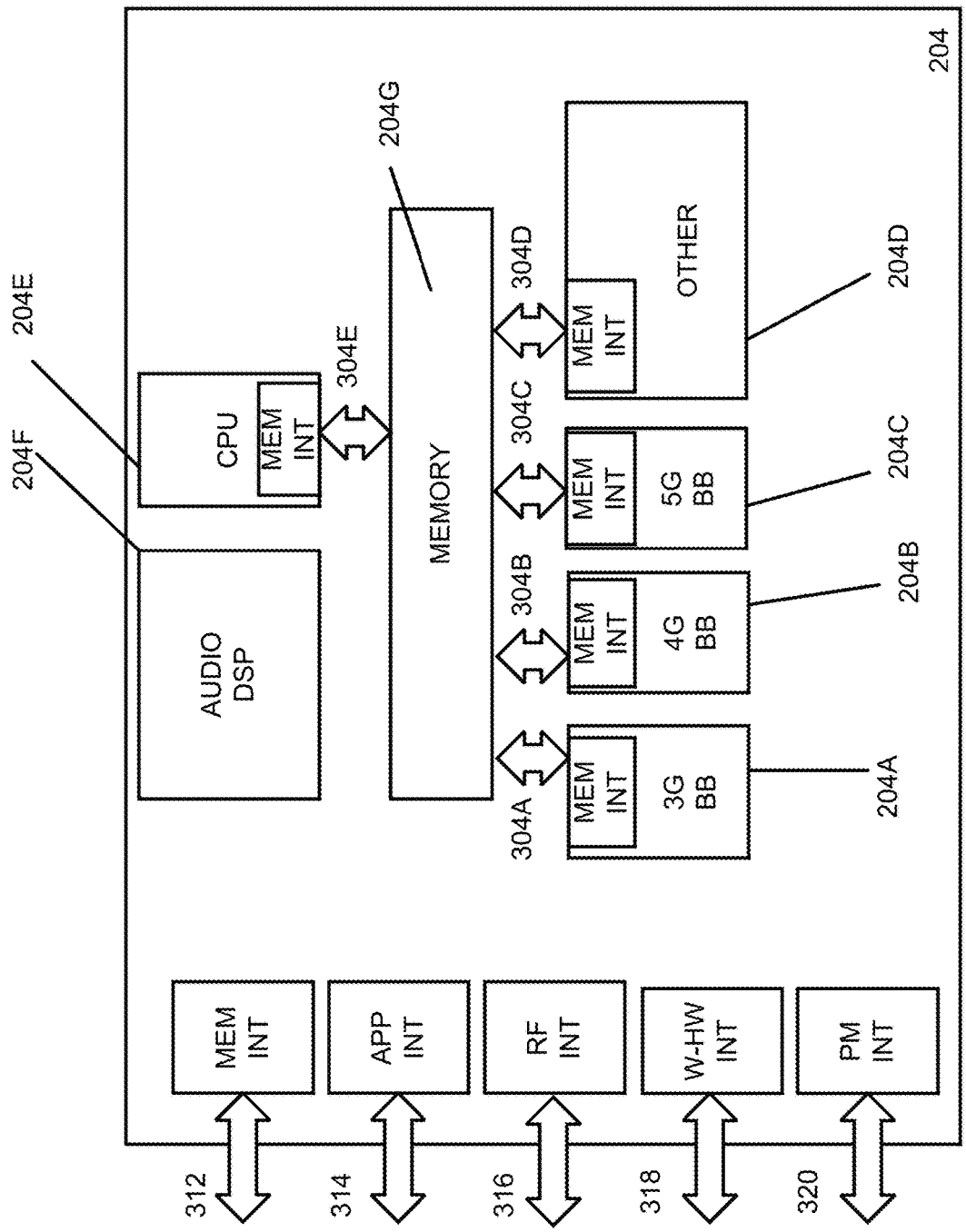
FIG. 3 another block diagram of an example of wireless communications network environment for network device (e.g., a UE, gNB or an eNB) with various interfaces according to various aspects or embodiments.

FIG. 3 illustrates example interfaces of baseband circuitry in accordance with some embodiments. As discussed above, the baseband circuitry 204 of FIG. 2 can comprise processors 204A-204E and a memory 204G utilized by said processors. Each of the processors 204A-204E can include a memory interface, 304A-304E, respectively, to send/receive data to/from the memory 204G.

The baseband circuitry 204 can further include one or more interfaces to communicatively couple to other circuitries/devices, such as a memory interface 312 (e.g., an interface to send/receive data to/from memory external to the baseband circuitry 204), an application circuitry interface 314 (e.g., an interface to send/receive data to/from the application circuitry 202 of FIG. 2), an RF circuitry interface 316 (e.g., an interface to send/receive data to/from RF circuitry 206 of FIG. 2), a wireless hardware connectivity interface 318 (e.g., an interface to send/receive data to/from Near Field Communication (NFC) components, Bluetooth® components (e.g., Bluetooth® Low Energy), Wi-Fi® components, and other communication components), and a power management interface 320 (e.g., an interface to send/receive power or control signals to/from the PMC 212.

Figure 4:
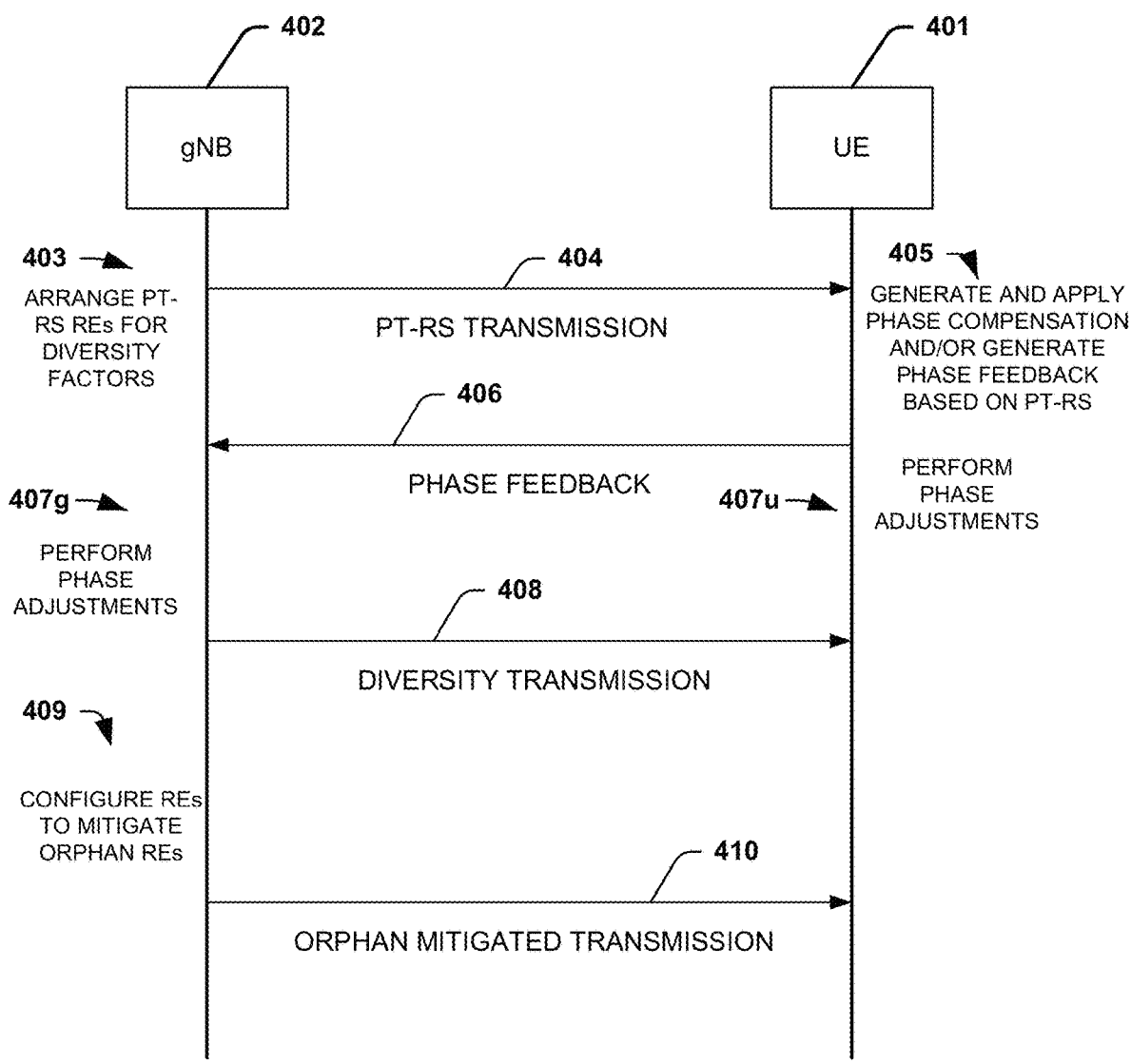
FIG. 4 is a diagram illustrating an architecture of a system that facilitates phase noise compensation for diversity transmission and mitigates orphan resource elements.

FIG. 4 is a diagram illustrating an architecture of a system 400 that facilitates phase noise compensation for diversity transmission and mitigates orphan resource elements and associated resources. The system or apparatus 400 can be utilized with the above embodiments and variations thereof, including the system 100 described above. The system 400 is provided as an example and it is appreciated that suitable variations are contemplated.

The system 400 includes a network device 401 and a node 402. The device 401 is shown as a UE device and the node 402 is shown as gNB for illustrative purposes. It is appreciated that the UE device 401 can be other network devices, such as APs, ANs and the like. It is also appreciated that the gNB 402 can be other nodes or access nodes (ANs), such as BSs, eNB, gNB, RAN nodes, UE and the like. Other network or network devices can be present and interact with the device 401 and/or the node 402. Operation of the device 401 and/or the node 402 can be performed by circuitry, such as the baseband circuitry 204, described above.

Generally, downlink (DL) transmissions occur from the gNB 402 to the UE 401 whereas uplink (UL) transmissions occur from the UE 401 to the gNB 402. The downlink transmissions typically utilize a DL control channel and a DL data channel. The uplink transmissions typically utilize an UL control channel and a UL data channel. The various channels can be different in terms of direction, link to another gNB, eNB and the like.

The UE 401 is one of a set or group of UE devices assigned to or associated with a cell of the gNB 402.

The gNB 402 and/or the UE 401 have a plurality of antenna ports (APs) that can be used for transmission and/or reception. The APs can introduce noise into received or transmitted signals. This introduced noise includes phase noise. The gNB 402 can apply phase compensation to mitigate the phase noise. In one example, the APs have or share about the same phase noise.

One technique to mitigate the phase noise is to use a phase tracking reference signal (PT-RS). The PT-RS is used to obtain phase noise feedback and/or generate phase compensation. The phase compensation is then applied to the signals received and/or transmitted at the APs. In one example, the phase compensation is generated at the receiver and the phase compensation is performed at the receiver. In one example, the phase compensation is AP specific. In another example, the phase compensation is applied to most or all of the APs of the gNB 402.

Some of the APs, such as N APs, can be used for demodulation reference signals (DRMSs) and some of the APs, such as K APs, can be used for data transmission and or PT-RS transmission. The N APs can be varied from the K APs, including having different numbers of APs. In another example, the number of DMRS APs (N APs) are the same as the number of transmission/transmitter APs (K APs), such as for a SFBC or STBC transmission scheme.

A PT-RS or PT-RS RE pattern can be predefined in a specification and the like. For this example, the gNB 402 is described as generating the PT-RS, however it is appreciated that the UE 401 can also generate PT-RS and/or PT-RS patterns and/or arrangements. For uplink (UL), the PT-RS is generated by the UE 401 and for downlink (DL), the PT-RS is generated by gNB 402.

The gNB 402 generates a phase tracking reference signal (PT-RS) to facilitate phase noise compensation for diversity transmission(s). The PT-RS is assigned to or arranged in PT-RS resource elements (REs) by, for example, a baseband circuitry 204, along with data REs and other information into a block or arrangement for transmission at 403. The PT-RS REs and the data REs are arranged based on one or more diversity factors. The other information can include DMRS, control channels, and the like. The arrangement can include resource mapping.

It is appreciated that the REs can include one or more symbols, partial symbols, one or more subcarriers and the like.

The one or more diversity factors include a time domain, frequency domain, symbols, subcarriers, transmitter antenna ports (APs), demodulation reference signal (DMRS) APs, pairing, precoders, precoder resource block group (PRG) size, OCC, and the like. The one or more diversity factors can be used to arrange the PT-RS REs with the data REs. There are various examples, allocations and arrangements for these one or more diversity factors described below, including FIGS. 5-10. It is appreciated that variations of these and the like are considered and can be used with the system 400.

The gNB 402 transmits the PT-RS transmission having the arrangement to the UE 401 at 404.

The UE 401 receives the PT-RS transmission and obtains or decodes the PT-RS from the PT-RS transmission. The UE 401 can obtain the PT-RS from the transmission based on a configuration of the arrangement. The configuration can be received from higher layer signaling, control information and the like.

The UE 401 generates or determines phase compensation based on the obtained PT-RS at 405. The UE 401 can apply the phase compensation to received signals at the UE 401.

The UE 401 can also generate phase feedback based on the obtained PT-RS at 405. The phase feedback can be based on or related to the one or more diversity factors, including antenna ports and the like.

The UE 401 transmits the generated phase feedback as a phase feedback transmission at 406. In addition or instead of the phase feedback transmission, the UE 401 can generate and/or arrange a PT-RS and PT-RS REs for UL.

The gNB 402 receives the phase feedback transmission and generates phase compensation based on the generated phase feedback. The phase compensation can be based on the one or more diversity factors, such as APs. The gNB 402 performs phase adjustments at 407g based on the phase compensation for subsequent diversity transmissions. The diversity transmissions are transmissions that utilize two or more APs.

Alternately, the gNB 402 can generate and apply phase compensation for received signals using a UE 401 generated PT-RS at 407g.

Further, the UE 401 can apply the phase compensation at 407u.

The gNB 402 can generate one or more phase compensated diversity transmissions at 408. These transmissions include the phase compensation, thus the transmissions can have higher signal to noise ratios, signal to interference noise ratios, and the like. Some examples of diversity transmissions are shown below as transmission 500.

The above example is generally described for downlink communications from the gNB 402 to the UE 401, where the gNB 402 generates the PT-RS and the UE 401 applies phase compensation to received signals based on the received PT-RS. However, it is appreciated that the examples can also be applied for uplink communications from the UE 401 to the gNB 402, where the UE 401 generates the PT-RS and the gNB 402 applies phase compensation to received signals based on the received PT-RS.

In addition to the phase compensation, the gNB 402 can also mitigate orphan resource elements (REs) and/or associated resources in transmissions.

At 409, the gNB 402 uses circuitry, such as the baseband circuitry 204, to arrange/configure orphan resource elements and/or associated resource for a transmission. The arrangement mitigates orphan REs and/or associated resources (referred to as orphan resources) The gNB 402 can arrange and/or configure REs based on one or more orphan RE factors including symbol position, beam sweeping pattern, beam pair links (BPLs), slots, pairing, subcarrier spacing and the like. The arrangement of REs can be used for control channels, physical uplink control channels (PUCCHs), long PUCCH and the like. The arrangement can be used, for example, when SFBC, STBC and/or the like is applied.

The gNB 402 can mitigate the orphaned REs using the one or more orphan RE factors and one or more options, described below. In one example, the gNB 402 determines a kind/type of orphan REs and selects an option to mitigate orphan REs based on the determined type. Then, the selected option is utilized for arrangement of symbols, subcarriers, slots, BPLs, and the like to mitigate orphan REs and orphan resources.

Various examples of mitigating orphaned REs are provided below, including with regard to FIGS. 11-18. It is appreciated that suitable variations of the examples are contemplated.

The orphan mitigated arrangement can be used for one or more transmissions by the gNB 402 at 410. Additionally, the orphan mitigated arrangement can be used for diversity transmissions, such as at 408.

Figure 5:
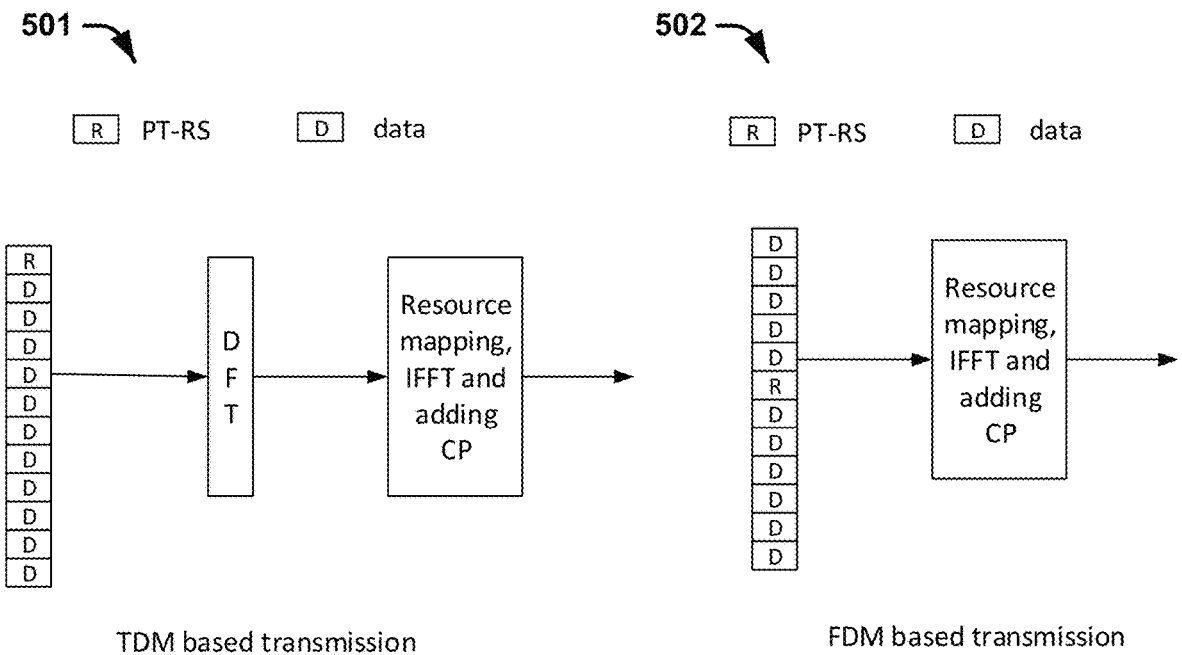
FIG. 5 is a diagram illustrating types of PT-RS transmissions for a communication system in accordance with some embodiments.

FIG. 5 is a diagram illustrating types of PT-RS transmissions 500 for a communication system in accordance with some embodiments. The transmissions 500 are provided for illustrative purposes and it is appreciated that components/elements can be included and/or omitted. Further, the transmissions 500 can be utilized with the system 400 and/or the system 100, described above.

A left side depicts an example TDM based transmission. A plurality of slots or blocks are shown and denoted as R for PT-RS and D for data. A discrete Fourier transform (DFT) is applied to the blocks of data at a DFT stage. Next, resource mapping, IFFT and cyclic prefixes (CP) are added at a next stage.

A technique is used to include the PT-RS with the transmission and control signaling to support transmit diversity for the TDM based transmission.

A right side depicts an example FDM based transmission. A plurality of slots or blocks are shown and denoted as R for PT-RS and D for data. Resource mapping, IFFT and cyclic prefixes (CP) are added at a next stage.

A technique is used to include the PT-RS with the transmission and control signaling to support transmit diversity for the FDM based transmission.

For multiple input-multiple output (MIMO) systems, an open-loop MIMO can also be a utilized transmission type. Some other diversity based type transmissions that can be included with 500 include:

Space Time Block Coding (STBC)
Space Frequency Block Coding (SFBC)
Beam/precoder cycling These transmission types can also be modified to utilize transmit diversity.

Several examples of TDM based PT-RS transmission(s) 501 that facilitate transmitter diversity are shown below. The phase compensation can be performed after IDFT, as shown. Thus, PT-RS should be transmitted with the same scheme as data.

For an STBC based transmission scheme/type, N resource elements (REs) of PT-RS in time domain are paired and transmitted in a STBC manner. The STBC is performed before the DFT of the resource elements (REs) or blocks.

For a SFBC based transmission scheme/type, N REs of PT-RS in the frequency domain are paired and transmitted in SFBC manner. The SFBC is performed prior to performing the DFT. Here, N also denotes the number of antenna ports.

The RE pairing method for PT-RS and data should be the same. Alternatively the PT-RS is only transmitted from one AP and it can be paired with data to form the STBC/SFBC transmission.

In another example, a UE device employs multi-panel based beam/precoder cycling. Here, the PT-RS can be generated with same or different sequences, which can be determined by an AP index and DMRS sequences or scramble. PT-RS densities can be determined by numerology.

Several examples of FDM based PT-RS transmission(s) 502 follow. Generally, phase compensation is performed prior to MIMO equalization. The receiver or UE device estimate the phase offset between PT-RS symbol and DMRS symbol and compensate the phase offset. Then the compensated channel can be used for MIMO equalization.

In one example for STBC/SFBC transmission, the PT-RS can be quasi-co-located (QCLed) or shared with one antenna port (AP) of Demodulation Reference Signal (DMRS) in turns. The AP index of the PT-RS can be pre-defined or determined by the subcarrier/symbol index, configured by higher layer signaling, dynamically indicated in Downlink Control Information (DCI) and the like. Additionally, an AP index of the PT-RS can be associated with a DM-RS. The association between PT-RS AP and DM-RS AP can be predefined in the specification, configured by higher layers, dynamically indicated in the DCI, and or the like. It is appreciated that there may be only 1 AP PT-RS which is QCLed or shared with one or more APs of DMRS.

In one example, the number of AP for DMRS is 2, which are designated AP 0 and AP 1. The PT-RS can use or be QCLed with AP 0 for odd symbols or some subcarriers and AP 1 for even symbols or the other subcarriers.

Figure 6:
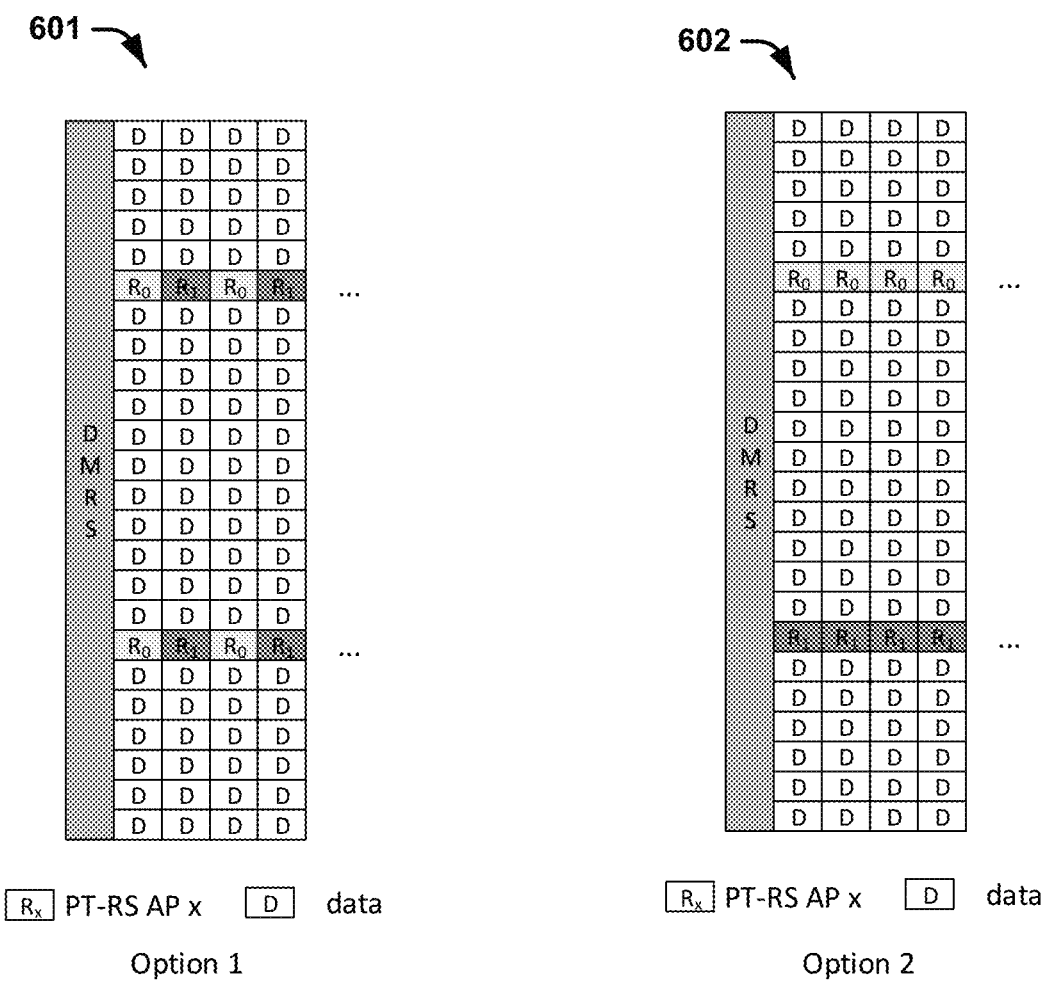
FIG. 6 is a diagram illustrating resource element/block allocations or arrangements for PT-RS transmissions in accordance with some embodiments.

FIG. 6 is a diagram illustrating resource element/block allocations or arrangements 600 for PT-RS transmissions in accordance with some embodiments. The arrangements 600 can be used for PT-RS transmissions that facilitate transmission diversity. Further, the allocations 600 can be utilized with the system 400 and/or the system 100, described above.

The arrangements 600 and variations thereof distinguish or differentiate between antenna ports (APs) for PT-RS, data, and DMRS.

Here, PT-RS are allocated multiple antenna ports (APs) designated as AP 0 and AP 1. The number N of antenna ports is 2, thus there is AP 0 and AP 1. A plurality of slots or blocks are shown and denoted as $R_x$ for PT-RS and D for data, where x of 0 is associated with AP 0 and x of 1 is associated with AP 1.

In a first arrangement 601, PT-RS are arranged by symbols and subcarriers. PT-RS associated with AP 0 are located on odd numbered symbols (relative to the DMRS) and PT-RS associated with AP 1 are located on even numbered symbols (relative to the DMRS).

In a second transmission arrangement 602, PT-RS are arranged by symbols and subcarriers. PT-RS associated with AP 0 are located on a 6th subcarrier (from the top) and PT-RS associated with AP 1 are located on an $18^{th}$ subcarrier (from the top).

It is appreciated that other variations of assigning the PT-RS with respect to symbols and/or subcarriers are contemplated.

In another example, APs of PT-RS can be distinguished by different orthogonal cover codes (OCC). The OCC can be pre-defined or configured by higher layer signaling or DCI. For example, when two APs are used for PT-RS, OCC with [1 1] can be applied for AP 0 of PT-RS while OCC with [1 –1] can be applied for AP 1 of PT-RS. Further, this OCC can be employed in the time and/or frequency domain, i.e., across different symbols or subcarriers.

If the number of DMRS APs is large or relatively large, additional PT-RS REs in the frequency domain can be used. The REs can be orthogonal with data and other PT-RS REs. An AP index for additional PT-RS can be pre-defined or determined by the symbol index or configured by higher layer signaling or dynamically indicated in the Downlink Control Information (DCI), and the subcarrier indexes can be pre-defined or determined by the symbol index or configured by higher layer signaling or Downlink Control Information (DCI). Further, the AP index of PT-RS can be associated with that of DM-RS. The association between PT-RS AP and DM-RS AP can be predefined in the specification or configured by higher layers or dynamically indicated in the DCI.

The allocations 600 can differentiate using the frequency domain (subcarrier), time domain (symbols), codes (such as OCC), and the like.

Figure 7:
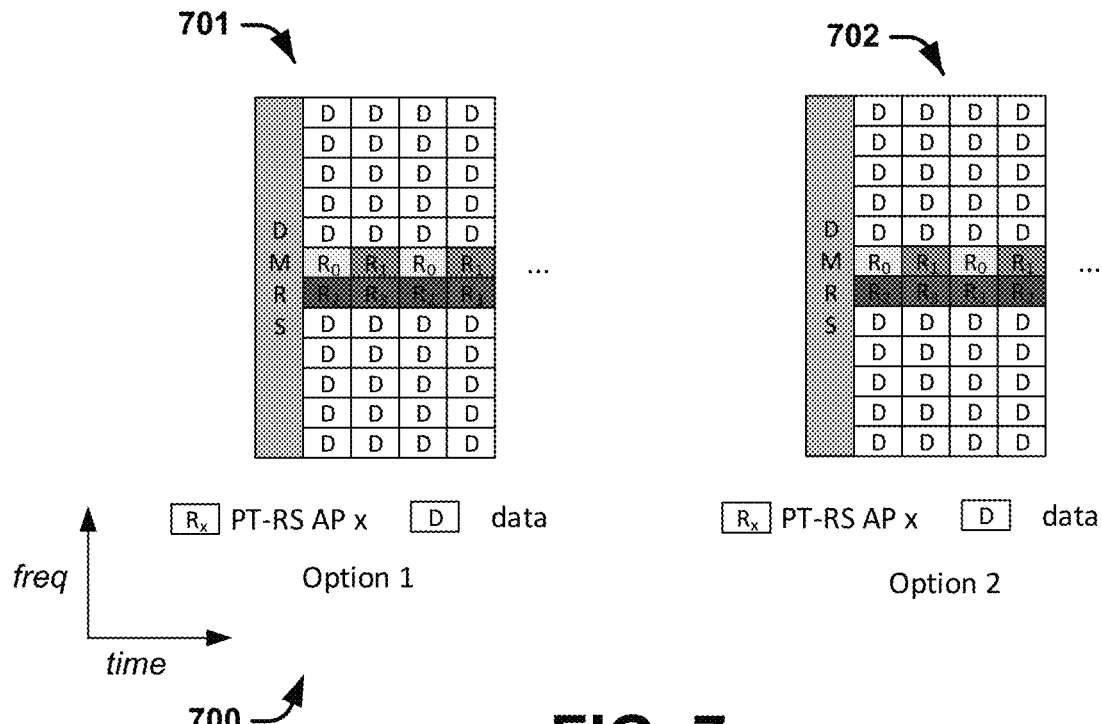
FIG. 7 is a diagram illustrating resource element arrangements/allocations for PT-RS transmissions in accordance with some embodiments.

FIG. 7 is a diagram illustrating resource element arrangements/allocations 700 for PT-RS transmissions in accordance with some embodiments. The arrangements 700 can be used for PT-RS transmissions that facilitate diversity. Further, the arrangements 700 can be utilized with the system 400 and/or the system 100, described above.

The arrangements 700 and variations thereof distinguish or differentiate between antenna ports (APs) for PT-RS, data, and DMRS using, for example, STBC/SFBC.

The number N of antenna ports in this example is 4, thus there is AP 0, AP 1, AP 2 and AP 3. The PT-RS are allocated to the different APs. A plurality of slots or blocks are shown and denoted as $R_x$ for PT-RS and D for data, where x of 0 is associated with AP 0, x of 1 is associated with AP 1, x of 2 is associated with AP 2 and x of 3 is associated with AP 3.

In a first arrangement 701, PT-RS are arranged by symbols and subcarriers. PT-RS associated with AP 0 and AP 2, $R_0$ and $R_2$, are located on odd numbered symbols (relative to the DMRS) and PT-RS associated with AP 1 and AP 3, $R_1$ and $R_3$, are located on even numbered symbols (relative to the DMRS).

In a second transmission arrangement 702, PT-RS are arranged by symbols and subcarriers. PT-RS associated with AP 0 and AP1 are located on a $6^{th}$ subcarrier (from the top) and PT-RS associated with AP 2 and AP 3 are located on a $7^{th}$ subcarrier (from the top).

It is appreciated that other variations of assigning/mapping the PT-RS with respect to symbols and/or subcarriers are contemplated.

Figure 8:
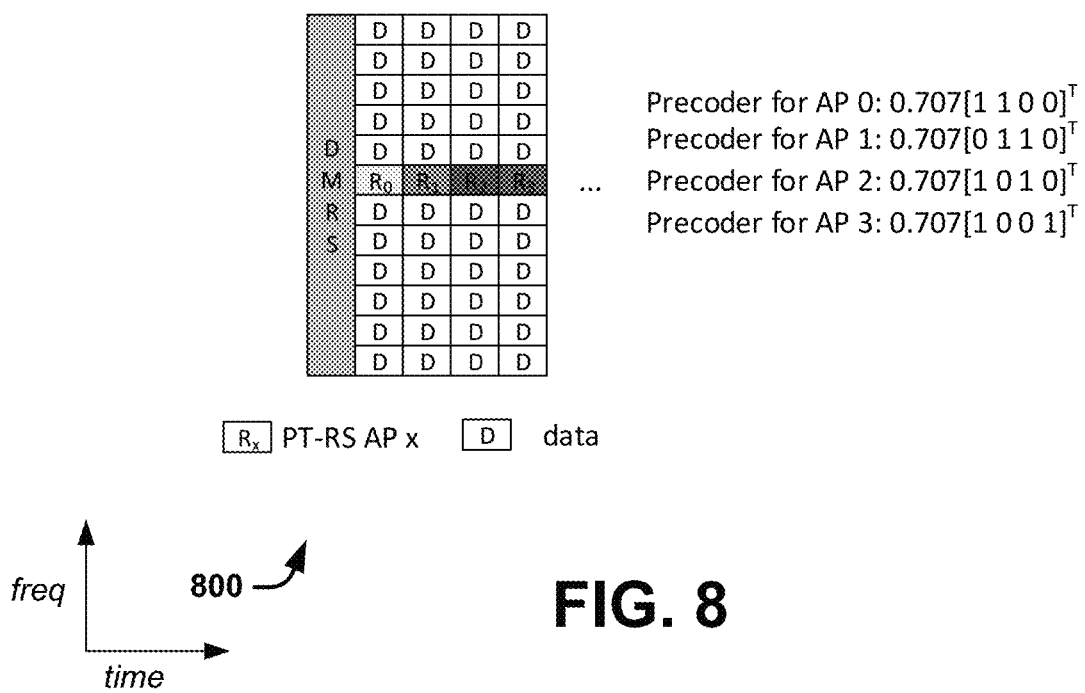
FIG. 8 is a diagram illustrating resource element (RE) arrangement(s) for PT-RS transmissions based on precoders in accordance with some embodiments.

FIG. 8 is a diagram illustrating resource element (RE) arrangement(s) 800 for PT-RS transmissions based on precoders in accordance with some embodiments. The arrangements 800 can be used for PT-RS transmissions that facilitate diversity. Further, the arrangements 800 can be utilized with the system 400 and/or the system 100, described above.

The arrangement 800 includes precoded PT-RS based on a sub-set and/or all of APs of DMRS. The subset can be pre-defined or determined by the number of APs and/or symbol index. The precdoder(s) can be pre-defined, determined by a symbol index, configured by higher layer signaling, configured by DCI, and the like.

The PT-RS are precoded for antenna ports (APs) designated as AP 0, AP 1, AP 2 and AP 3. The number N of antenna ports is 4. A plurality of blocks or REs are shown and denoted as $R_x$ for PT-RS and D for data, where x of 0 is associated with AP 0 and x of 1 is associated with AP 1.

The $R_x$ are precoded and shown using a common subcarrier in the frequency domain and along different symbols in the time domain.

In the example shown in the arrangement 800, $R_0$ is at a first symbol, $R_1$ is at a second symbol, $R_2$ is at a third symbol and $R_3$ is at a fourth symbol and $R_1$, $R_2$, $R_3$ and $R_4$ are located on a sixth subcarrier from the top.

$R_0$ uses precoder $0.707[1100]^T$ for AP 0.
$R_1$ uses precoder $0.707[0110]^T$ for AP 1.
$R_2$ uses precoder $0.707[1010]^T$ for AP 2.
$R_3$ uses precoder $0.707[1001]^T$ for AP 3.

It is appreciated that variations using other precoders and/or numbers of precoders are contemplated.

Figure 9:
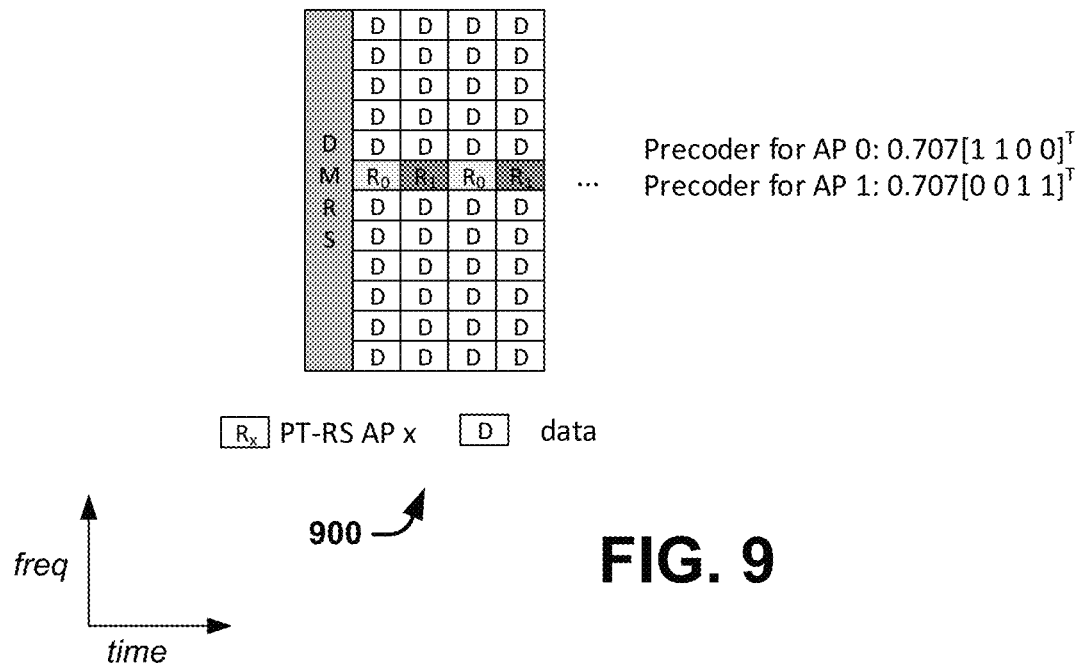
FIG. 9 is a diagram illustrating resource element (RE) arrangement(s) for PT-RS transmissions based on precoders in accordance with some embodiments.

FIG. 9 is a diagram illustrating resource element (RE) arrangement(s) 900 for PT-RS transmissions based on precoders in accordance with some embodiments. The arrangement 900 can be used for PT-RS transmissions that facilitate diversity. Further, the allocations arrangement can be utilized with the system 400 and/or the system 100, described above.

It is noted that the number of APs for PT-RS can be smaller than the number of DMRS as shown in 900. In one example, assuming the number of APs, N=4 for STBC/SFBC with four DM-RS APs {AP 0, AP 1, AP 2, AP 3} and two PT-RS APs {AP 4 and AP 5}, two DM-RS APs can be associated with one PT-RS AP. For example, DM-RS AP 0 and AP 1 are associated with PT-RS AP 4 while DM-RS AP 2 and AP 3 are associated with PT-RS AP 5. It is noted that the association between PT-RS AP and DM-RS AP can be predefined in the specification, configured by higher layers, dynamically indicated in the DCI and the like.

In the example shown in the allocation 900, $R_0$ is at a first symbol, $R_1$ is at a second symbol, $R_0$ is at a third symbol and $R_1$ is at a fourth.

$R_0$ uses precoder $0.707[1100]^T$ for AP 0.
$R_1$ uses precoder $0.707[0011]^T$ for AP 1.

In another example allocation, a base sequence of or for PT-RS is determined by an AP index, a symbol/slot/subframe/frame index and/or a base sequence or scrambling of DMRS. In one example, the PT-RS can share the same scrambling ID as DMRS, and it can be generated based on an extended sequence after the DMRS. The PT-RS and DMRS can be generated based on the same virtual cell ID or different cell ID, which can be pre-defined or configured by higher layer signaling.

The allocations provided above in FIGS. 6-9 illustrate example arrangements/allocations that can be used with the systems 100 and/or 400 utilizing TDM and/or FDM. The example allocations include a sequence for PT-RS that can be based on symbol, subframe, subcarrier, AP, precoder, aspects of the DMRS and the like. It is appreciated that suitable variations are contemplated, including combinations of the provided allocations.

Figure 10A:
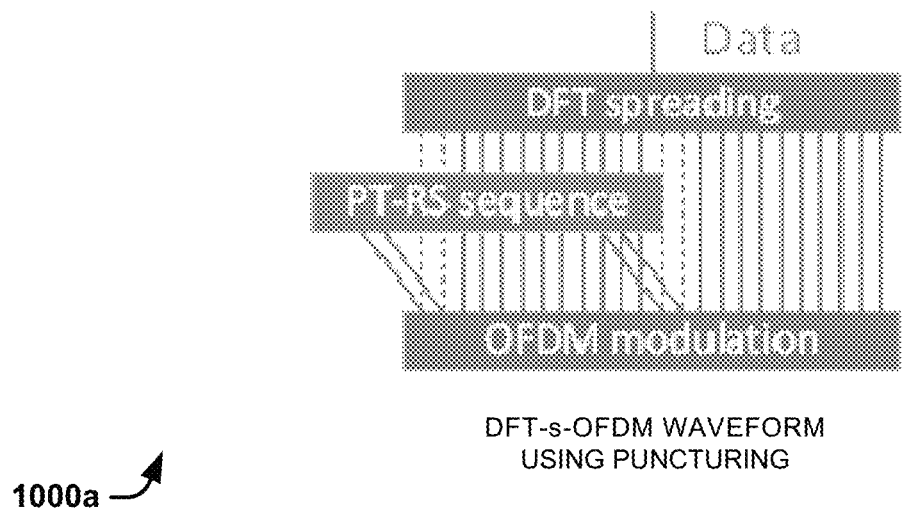
FIGS. 10A and 10B depict example FDM PT-RS for DFT-s-OFDM waveforms in accordance with some embodiments.
Figures 10B, 11:
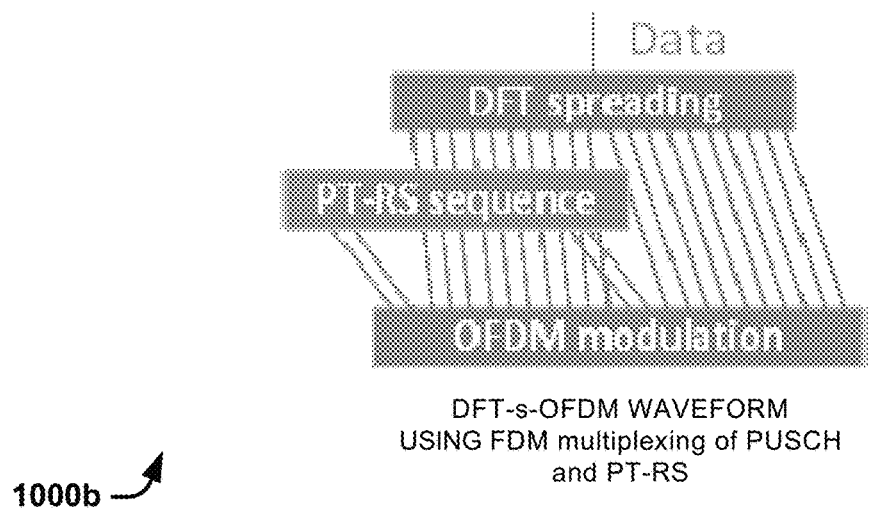
FIG. 11 depicts a table for Space-Time Block Coding (STBC) of a DFT-s-OFDM waveform in accordance with some embodiments.

FIGS. 10A and 10B depict example FDM PT-RS for discrete Fourier transform spreading orthogonal frequency division multiplexing (DFT-s-OFDM) waveforms in accordance with some embodiments.

FIG. 10A depicts an example FDM PT-RS for DFT-s-OFDM waveform 1000a using physical uplink shared channel (PUSCH) puncturing. For this example, N is the total number of subcarriers in the allocated bandwidth. After an N-point DFT, the PUSCH symbols are mapped to the resource elements (REs). The REs used for PT-RS are punctured.

FIG. 10B depicts an example FDM PT-RS for DFT-s-OFDM waveform 1000b using FDM multiplexing of PUSCH and PT-RS. The PUSCH and PT-RS are allocated with different resource elements, where N-k points DFT are applied to PUSCH, where N is the total number of subcarriers in the allocated bandwidth and k is the number of subcarriers used for PT-RS in an OFDM symbol.

It is appreciated that the PT-RS can be multiplexed in the FDM manner as shown in FIGS. 10A and 10B. Thus, some REs for data can be punctured and/or reserved for PT-RS and the index of REs to be punctured or reserved can be determined, as shown above.

It is appreciated that other channels instead of or in addition to a PUSCH can be used in the FDM manner as shown in FIGS. 10A and 10B.

The above allocations and waveforms for PT-RS configuration can also apply when beam/precoder cycling is employed as the transmission scheme.

For beam/precoder cycling and subband precoding, Precoding Resource blocks Group (PRG) size may not be full bandwidth. Alternatively beam/precoder cycling can be used in a partial slot level. One PRG can indicate the resource for multiple symbols. Then the PT-RS may be used to compensate a phase offset within a PRG as a signal to interference plus noise ratio (SINR) in different PRG may change fast.

In one example, apart from Modulation and Coding Scheme (MCS), the dynamic presence of PT-RS can be determined by the PRG size when beam/precoding cycling is used. A PRG size threshold can be predefined in the specification, which may be associated with transmission bandwidth or configured by higher layer signaling. Additionally, when the PRG size is below the threshold, the PT-RS is not enabled if the beam/precoder cycling is used.

In another example, a time/frequency density of PT-RS can be determined by the PRG size when beam/precoder cycling is used. A candidate PRG size to PT-RS density table can be pre-defined, configured by higher layer signaling and/or the like.

It is noted that the PT-RS density and dynamic presence can be PRG specific or determined by the mean/smallest/largest PRG size if the PRG size is different.

FIG. 11 depicts a table 1100 for Space-Time Block Coding (STBC) of a DFT-s-OFDM waveform in accordance with some embodiments. The STBC can be used with the systems 100, 400 and variations thereof.

The table 1100 provides an example mapping of symbols to APs. In this example, original symbols to be transmitted are [s0, s1] for a PUSCH and there are 2 APs. The original symbols are mapped/encoded to the APs as shown in table 1100.

The table 100 depicts a first row for AP 0 and includes consecutive symbols, Symbol l and Symbol l+1 and a second row for AP 1 and includes consecutive symbols, Symbol l and Symbol l+1.

The PUSCH symbols [s0, s1] can be encoded to [s0, −s1*] for PUSCH port 1 (AP 0) and [s1, s0*] for PUSCH port 2 (AP 1), where (x)* denotes the conjugate of number x.

It is appreciated that other suitable mappings/encodings are contemplated. Additionally, other channels in addition to or instead of PUSCH can be used. Further, other coding, such as SFBC can be used.

For DMRS, the mapping could be:
AP 0: [x 0]
AP 1: [0 y]

It is appreciated that Space-Time Block Coding (STBC) can be considered to support the diversity based transmission scheme for DFT-s-OFDM waveform(s). Subcarriers in consecutive symbols can be paired to transmit data.

For DFT-s-OFDM waveform, the Space-Time Block Coding (STBC) can support a diversity based transmission scheme. In one example, the subcarriers in consecutive symbols can be paired to transmit the data.

Figure 12:
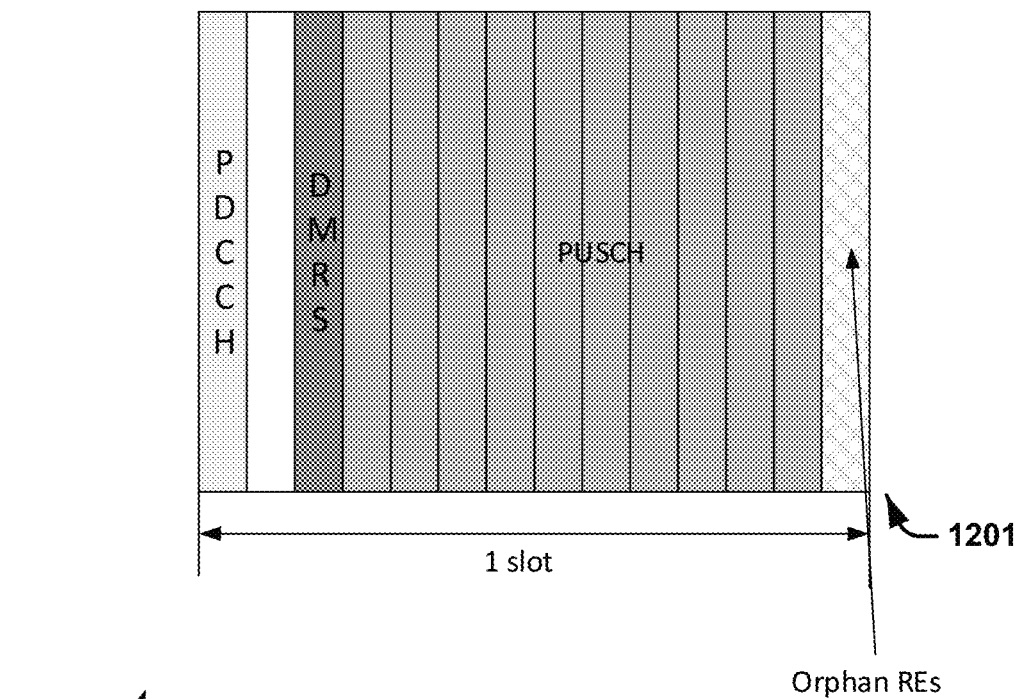
FIG. 12 is a diagram illustrating STBC in one slot when the number of APs is 2 for a diversity transmission in accordance with some embodiments.

FIG. 12 is a diagram illustrating STBC 1200 in one slot when the number of APs is 2 for a diversity transmission in accordance with some embodiments.

The STBC 1200 can be used for transmissions, including downlink, uplink, DMRS, PUSCH and the like. The STBC 1200 can be used with the systems 100, 400 and variations thereof.

The STBC 1200 shows a single slot that begins with a symbol for a physical downlink control channel (PDCCH), then DMRS, and 10 symbols for a PUSCH. It is noted that there can be one or more orphaned REs proximate the end of the slot as shown at 1201. In this example, there is one DMRS.

Analog beamforming can used to increase a link budget for wireless systems, such as a mili-meter Wave (mmWave) system. The gNB and UE, such as gNB 402 and UE 401, can maintain N(N>1) beam pair links (BPL). A BPL is a beamformed communication link between gNB and UE and the BPL can be identified by a BPL indicator.

Beam cycling can be used to achieve diversity gain. Additionally, different beams can be used in some/different symbols. Beam cycling can apply different beams to different time/frequency resources, including symbols, subcarriers and the like.

Figure 13:
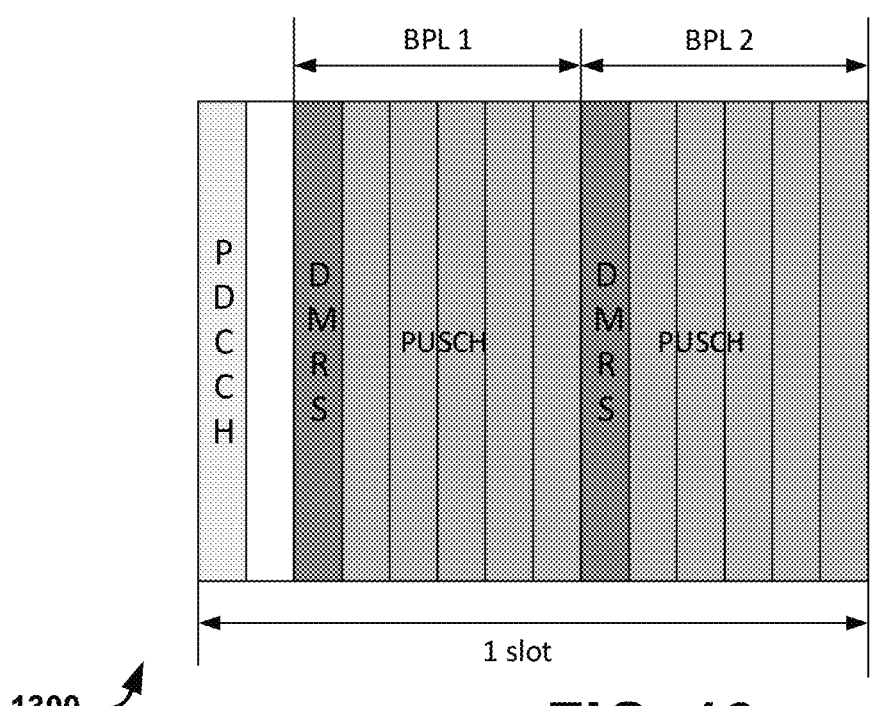
FIG. 13 is a diagram illustrating a STBC in one slot using different BPLs for different symbols in accordance with some embodiments.

Further, there can be additional (more than one) DMRS symbol(s) in one slot. As a result, different BPLs can be used for different symbols in one slot as shown in FIG. 13, below. Further different BPLs can also be used for multi-slot(s).

FIG. 13 is a diagram illustrating a STBC 1300 in one slot using different BPLs for different symbols. The STBC 1300 can be used with the systems 100, 400 and variations thereof.

The STBC 1300 shows a single slot that begins with a symbol for a physical downlink control channel (PDCCH), then a DMRS and 5 symbols for a PUSCH for a first BPL (BPL 1) and then a DMRS and 5 symbols for a PUSCH for a second BPL (BPL 2). Thus, in this example, some symbols are assigned to BPL 1 and other symbols are assigned to BPL 2.

It is appreciated that other suitable variations are contemplated, including variations with more than two BPLs.

Figure 14:
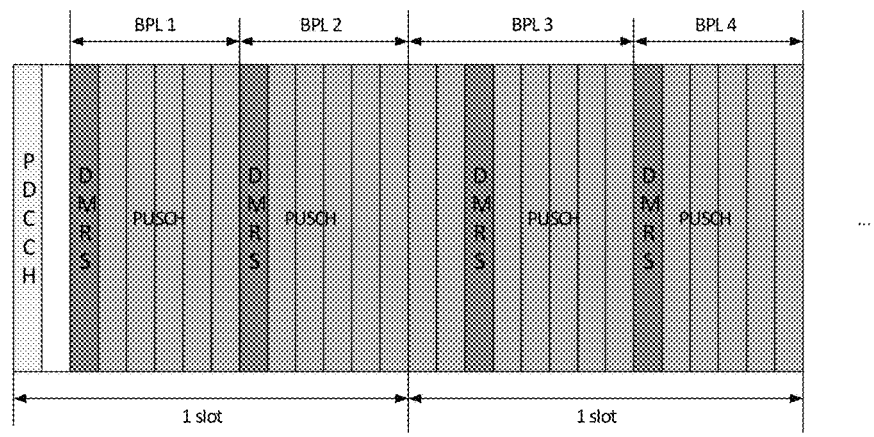
FIG. 14 is a diagram illustrating a STBC in one slot using beam cycling in multiple slots in accordance with some embodiments.

FIG. 14 is a diagram illustrating a STBC 1400 in one slot using beam cycling in multiple slots in accordance with some embodiments. The STBC 1400 can be used with the systems 100, 400 and variations thereof.

The STBC 1400 shows two slots as shown. A first slot includes a physical downlink control channel (PDCCH), a first BPL (BPL 1) and a second BPL (BPL 2). A second slot includes a third BPL (BPL 3) and a fourth BPL (BPL 4).

It is noted that the front-loaded DMRS can use 1 or 2 symbols and the additional DMRS symbol in the subsequent BPL may unused.

Using both beam cycling and STBC can facilitate or achieve diversity gain.

The design, arrangement and/or position of additional DMRS symbols, symbols, subcarriers, slots, beam sweeping patterns and the like can be configured to mitigate orphan REs and/or associated resources as shown below.

It is noted that these examples can be applied for transmission of a long physical uplink control channel (PUCCH) when SFBC or STBC is applied.

For a STBC based transmission scheme, there can be one or more orphan REs if the number of data symbols is not a multiplier of number of APs. Generally, there are 3 kinds of orphan symbols and/or REs:

Type 1 orphan REs: located before the DMRS of the next BPL;

Type 2 orphan REs: located before the data symbol of the next BPL;

Type 3 orphan REs: located at the last symbol of the whole PUSCH transmission.

Figure 15:
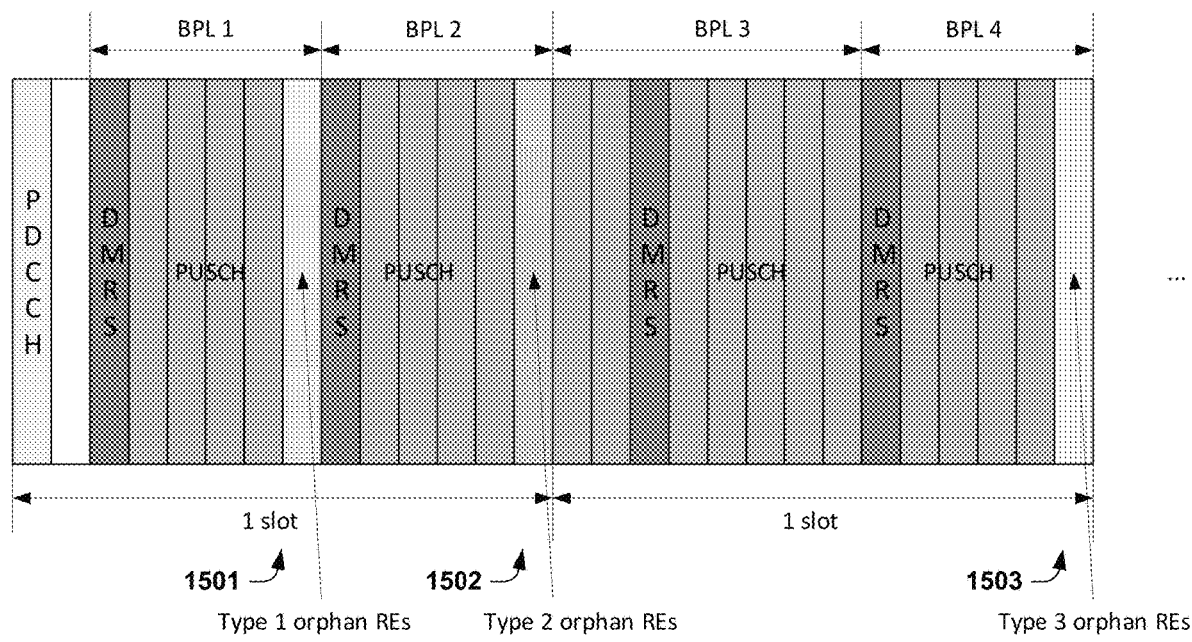
FIG. 15 is a diagram illustrating various options to handle or mitigate orphan resource elements (REs) of a transmission in accordance with some embodiments.

FIG. 15 is a diagram illustrating various options to handle orphan resource elements (REs) of an arrangement 1500 for a transmission in accordance with some embodiments. The transmission 1500 can be employed with the systems 100, 400 and variations thereof.

The arrangement 1500 depicts a first orphan RE (type 1) located before a DMRS of a next BPL at 1501, a second orphan RE (type 2) located before a data symbol of a next BPL at 1502 and a third orphan RE (type 3) located at a last symbol of a transmission or PUSCH transmission at 1503.

Some options to handle orphan REs include:

Option 1: Skip orphan REs which are not used for data transmission.

Option 2: Use orphan REs for partial symbol transmission. The partial symbol transmission can include, for example, that they are used to transmit symbol l or symbol l+1 in Table 1100.

Option 3: Use different numerologies, including subcarrier spacing, for orphan REs.

It is appreciated that other options or techniques of handling orphan REs are contemplated. Some additional examples are provided below.

In one example, the same or different options can be used for different types of orphan REs transmission. The options for each type can be pre-defined, configured by higher layer signaling, configured by Downlink Control Information (DCI) and the like.

In another example for orphan REs, numerology can be changed to create more symbols. Additionally, subcarrier spacing for the orphan RE(s) can be increased. The numerology for the orphan REs can be determined, in one example, by a number of DMRS APs or predefined or configured by higher layer signaling or DCI. As another example, subcarrier spacing can be doubled, then there can be two short symbols.

Figure 16:
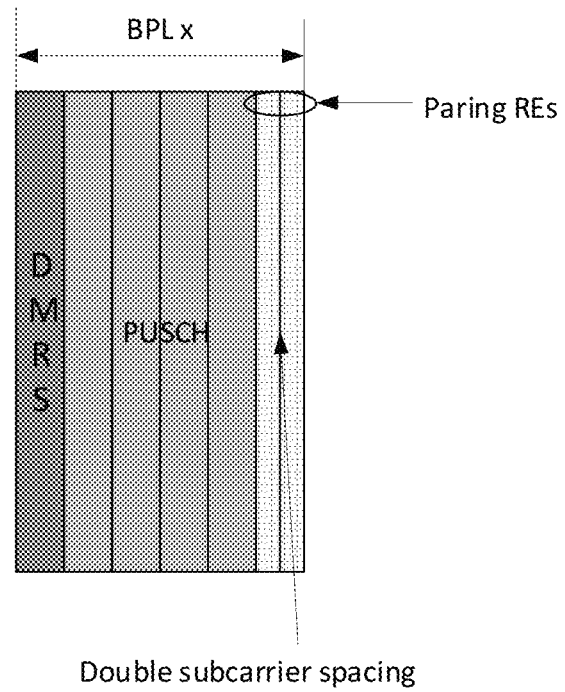
FIG. 16 is a diagram illustrating an example of orphan RE pairing for a transmission in accordance with some embodiments.

FIG. 16 is a diagram illustrating an example of orphan RE pairing of an arrangement 1600 for a transmission in accordance with some embodiments. The arrangement 1600 can be employed with the systems 100, 400 and variations thereof.

A pairing of REs is shown at an end of the transmission 1600. The subcarrier spacing is doubled and the orphaned REs use two short symbols.

A similar approach can be used for orphan RE handling for SFBC transmission. The subcarrier spacing for some symbols or the whole slots can be reduced.

Orphan REs can also be introduced if a phase tracking reference signal (PT-RS) is present, including with SFBC. To mitigate these orphan REs and/or resources, the subcarrier spacing for some symbols or the whole slots can be reduced. This can indicate the cross numerology scheduling wherein a first numerology is applied for control channel while a second numerology is employed for data channel.

Thus, using different numerology for orphan REs can be viewed as the option 3.

A determination on which option to use for orphan REs can be pre-defined, configured by higher layer signaling, configured by DCI independently, configured by DCI jointly, and the like. The determination can be separate for each orphan RE or it can be for a group or all REs.

In another example or option (option 4), orphan REs can be paired with other REs in the area of another BPL. Then, a beam sweeping pattern can be changed and determined by whether the cross-slot or cross-partial-slot RE pairing is allowed, which can be pre-defined, configured by higher layer signaling, configured by DCI and/or the like. For paired orphan REs, the BPL to be used can be pre-defined, configured by higher layer signaling, configured by DCI and/or the like.

Figure 17:
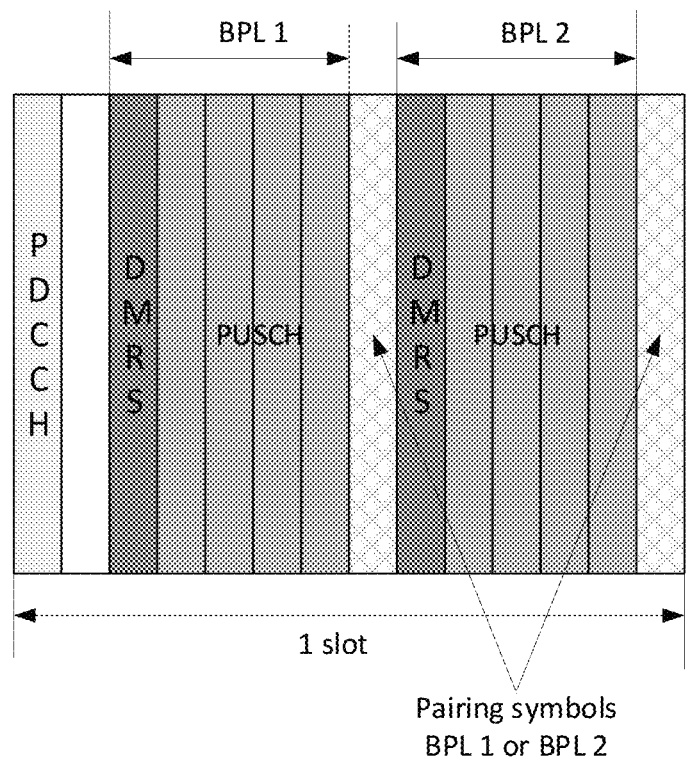
FIG. 17 is a diagram illustrating an example of cross-partial-slot RE pairing to mitigate orphan REs for a transmission in accordance with some embodiments.

FIG. 17 is a diagram illustrating an example of cross-partial-slot RE pairing for an arrangement 1700 for a transmission in accordance with some embodiments. The arrangement 1700 can be employed with the systems 100, 400 and variations thereof.

Here, there are two paired orphan REs as shown. Each RE can be configured to be in BPL 1 or BPL 2 according to the option 4. The REs are within the same slot. As stated above, the determination as to which BPL the orphan REs are assigned to can be pre-defined, configured by higher layer signaling, configured by DCI, and the like.

Figure 18:
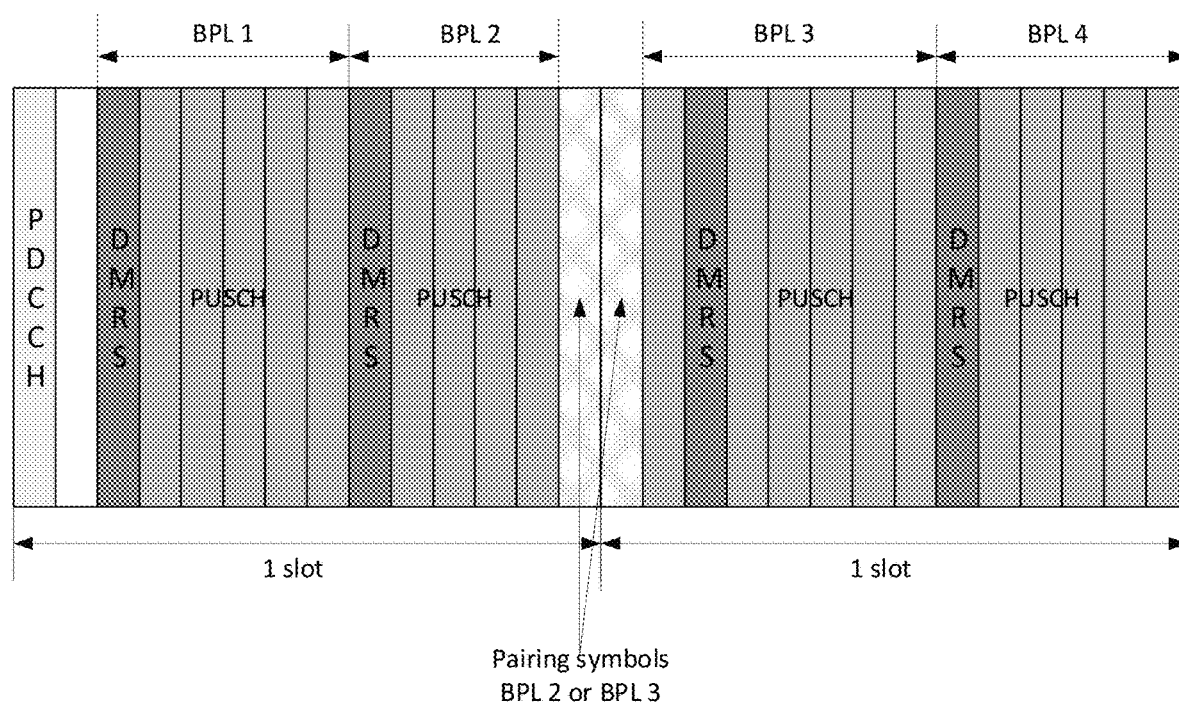
FIG. 18 is a diagram illustrating an example of cross-partial-slot RE pairing to mitigate orphan REs for a transmission in accordance with some embodiments.

FIG. 18 is a diagram illustrating an example of cross-partial-slot RE pairing for an arrangement 1800 for a transmission in accordance with some embodiments. The arrangement 1800 can be employed with the systems 100, 400 and variations thereof.

In this example, there are two orphaned REs that are paired. Each RE can be configured to be in BPL 2 or BPL 3. The BPL 2 is in a first slot and the BPL 3 is in a second slot. This ire referred to as cross-slot RE pairing.

In another example (option 5), a symbol index of additional DMRS can be configurable. This symbol index can be determined based on a number of DMRS APs and the transmission scheme, configured by DCI, configured by higher layer signaling and/or the like. The configuration of the symbol index can avoid one or more orphan REs within a slot.

It is appreciated that suitable variations of determining the orphan type, orphan option to use, and arrangement for a transmission are contemplated.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

As it employed in the subject specification, the term "processor" can refer to substantially any computing processing unit or device including, but not limited to including, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions and/or processes described herein. Processors can exploit nano-scale architectures such as, but not limited to, molecular and quantum-dot based transistors, switches and gates, in order to optimize space usage or enhance performance of mobile devices. A processor may also be implemented as a combination of computing processing units.

In the subject specification, terms such as "store," "data store," "data storage," "database," and substantially any other information storage component relevant to operation and functionality of a component and/or process, refer to "memory components," or entities embodied in a "memory," or components including the memory. It is noted that the memory components described herein can be either volatile memory or nonvolatile memory, or can include both volatile and nonvolatile memory.

By way of illustration, and not limitation, nonvolatile memory, for example, can be included in a memory, non-volatile memory (see below), disk storage (see below), and memory storage (see below). Further, nonvolatile memory can be included in read only memory, programmable read only memory, electrically programmable read only memory, electrically erasable programmable read only memory, or flash memory. Volatile memory can include random access memory, which acts as external cache memory. By way of illustration and not limitation, random access memory is available in many forms such as synchronous random access memory, dynamic random access memory, synchronous dynamic random access memory, double data rate synchronous dynamic random access memory, enhanced synchronous dynamic random access memory, Synchlink dynamic random access memory, and direct Rambus random access memory. Additionally, the disclosed memory components of systems or methods herein are intended to include, without being limited to including, these and any other suitable types of memory.

Examples can include subject matter such as a method, means for performing acts or blocks of the method, at least one machine-readable medium including instructions that, when performed by a machine cause the machine to perform acts of the method or of an apparatus or system for concurrent communication using multiple communication technologies according to embodiments and examples described herein.

Example 1 is an apparatus configured to be employed within a base station. The apparatus comprises baseband circuitry which includes a radio frequency (RF) interface and one or more processors. The one or more processors are configured to arrange phase tracking reference signal (PT-RS) resource elements (REs) and data REs as an arrangement for a transmission based on one or more diversity factors. The one or more diversity factors include a time domain and a frequency domain. The one or more processors are also configured to provide the transmission having the PT-RS REs to the RF interface for transmission to a user equipment (UE) device.

In a variation of Example 1, the UE device includes baseband circuitry having one or more processors configured to generate phase compensation based on the PT-RS and apply the generated phase compensation to the transmission to mitigate phase noise.

Example 2 includes the subject matter of Example 1, including or omitting optional elements, wherein the one or more diversity factors include one or more of symbols, subcarriers, transmitter antenna ports (APs), demodulation reference signal (DMRS) APs, pairing, and precoders.

Example 3 includes the subject matter of any of Examples 1-2, including or omitting optional elements, wherein the one or more processors are further configured to multiplex the PT-RS REs and the data REs using one of time division multiplexing (TDM) or frequency division multiplexing (FDM).

Example 4 includes the subject matter of any of Examples 1-3, including or omitting optional elements, wherein the transmission is a cyclic prefix-orthogonal frequency division multiplexing (CP-OFDM) waveform or a discrete Fourier transform spreading orthogonal frequency division multiplexing (DFT-s-OFDM) waveform.

Example 5 includes the subject matter of any of Examples 1-4, including or omitting optional elements, wherein the one or more processors are further configured to multiplex the PT-RS REs and the data REs using time division multiplexing (TDM) for one of space frequency block coding (SFBC), space time block coding (STBC) or beam/precoder cycling based transmission.

Example 6 includes the subject matter of any of Examples 1-5, including or omitting optional elements, wherein the PT-RS REs are transmitted using a plurality of demodulation reference signal (DMRS) antenna ports (APs).

Example 7 includes the subject matter of any of Examples 1-6, including or omitting optional elements, wherein the PT-RS REs are paired using data symbol pairing for SFBC or STBC.

Example 8 includes the subject matter of any of Examples 1-7, including or omitting optional elements, wherein the PT-RS REs are transmitted using a plurality of transmitter antenna ports (APs) and the number of transmitter APs is less than a number of demodulation reference signal (DMRS) APs.

Example 9 includes the subject matter of any of Examples 1-8, including or omitting optional elements, wherein the one or more processors are configured to arrange a sequence of the PT-RS REs based on one or more of an antenna port (AP) index, a symbol index, a slot index, a subframe index, a frame index, a cell identification (ID) and/or a virtual cell ID for PT-RS.

Example 10 includes the subject matter of any of Examples 1-9, including or omitting optional elements, wherein the virtual cell ID for PT-RS is predefined or configured by higher layer signaling and the virtual cell ID for PT-RS is varied from a virtual cell ID for a demodulation reference signal (DMRS).

Example 11 includes the subject matter of any of Examples 1-10, including or omitting optional elements, wherein the one or more processors are further configured to multiplex the PT-RS REs and the data REs using frequency division multiplexing (FDM) one of space frequency block coding (SFBC), space time block coding (STBC) or beam/precoder cycling based transmission.

Example 12 includes the subject matter of any of Examples 1-11, including or omitting optional elements, wherein the PT-RS REs are transmitted using a plurality of transmitter antenna ports (APs) and the number of transmitter APs is equal to a number of demodulation reference signal (DMRS) APs.

Example 13 includes the subject matter of any of Examples 1-12, including or omitting optional elements, wherein the one or more processors are configured to assign the PT-RS REs to a plurality of antenna ports (APs) and multiplex each of the PT-RS REs based on the assigned AP of the plurality of APs.

Example 14 includes the subject matter of any of Examples 1-13, including or omitting optional elements, wherein the PT-RS REs are precoded using one or more precoders, wherein the one or more precoders are configured by higher layer signaling, downlink control information (DCI), a symbol index, and/or a subcarrier index.

Example 15 includes the subject matter of any of Examples 1-14, including or omitting optional elements, wherein the transmission is a discrete Fourier transform spreading orthogonal frequency division multiplexing (DFT-s-OFDM) waveform and one or more of the data REs are punctured or reserved for PT-RS.

Example 16 includes the subject matter of any of Examples 1-15, including or omitting optional elements, wherein the one or more diversity factors include a precoder resource block group (PRG) size.

Example 17 includes the subject matter of any of Examples 1-16, including or omitting optional elements, wherein the PT-RS REs are arranged using orthogonal cover codes (OCC) based on different antenna ports (APs).

Example 18 is an apparatus configured to be employed within a user equipment (UE) device comprising baseband circuitry. The baseband circuitry includes a radio frequency (RF) interface and one or more processors. The RF interface is configured to receive a transmission from a base station. The one or more processors are configured to obtain one or more phase tracking reference signal (PT-RS) resource elements (REs) from the received transmission according to an arrangement, the arrangement based on one or more diversity factors; obtain a demodulation reference signal (DMRS) from the received transmission; generate phase compensation based on the PT-RS; and apply the phase compensation for received diversity transmission(s).

Example 19 includes the subject matter of Example 18, including or omitting optional elements, wherein the one or more processors are configured to obtain a PT-RS from the PT-RS REs generate one or more recovery signals based on the beam recovery frame structure.

Example 20 includes the subject matter of any of Examples 18-19, including or omitting optional elements, wherein the one or more diversity factors include one or more of symbols, subcarriers, transmitter antenna ports (APs), demodulation reference signal (DMRS) APs, pairing, and precoders.

Example 21 is an apparatus configured to be employed within a base station. The apparatus comprises baseband circuitry which includes a radio frequency (RF) interface and one or more processors. The one or more processors are configured to determine an orphan type for a transmission; select an orphan mitigation option based on the determined orphan type; arrange a transmission frame based on the selected orphan mitigation option and one or more orphan factors, transmission frame having a plurality of resource elements (REs); and provide the transmission frame having orphan mitigation to the RF interface for transmission to a user equipment (UE) device.

Example 22 includes the subject matter of Example 21, including or omitting optional elements, wherein the transmission frame is a diversity transmission using space frequency block coding (SFBC) or space time block coding (STBC).

Example 23 includes the subject matter of any of Examples 21-22, including or omitting optional elements, wherein the one or more orphan factors include beam pair links (BPLs), subcarrier spacing, paring and subcarrier spacing.

Example 24 includes the subject matter of any of Examples 21-23, including or omitting optional elements, wherein the selected option includes using different numerologies and subcarrier spacing for symbols that contain orphan REs.

Example 25 includes the subject matter of any of Examples 21-24, including or omitting optional elements, wherein the selected option includes skipping orphan REs and partial symbol transmission.

Example 26 is one or more computer-readable media having instructions that, when executed, cause a base station to determine an orphan type and an orphan mitigation option for a diversity transmission; arrange one or more phase tracking reference signal (PT-RS) resource elements (REs) for a diversity transmission, the arrangement based on one or more diversity factors and the orphan mitigation option; and transmit the diversity transmission having PT-RS resource elements and orphan RE mitigation.

Example 27 includes the subject matter of Example 26, including or omitting optional elements, wherein the diversity transmission uses space frequency block coding (SFBC) or space time block coding (STBC).

Example 28 includes the subject matter of any of Examples 26-27, including or omitting optional elements, wherein the one or more diversity factors include a plurality of antenna ports (APs) and a plurality of precoders.

Example 29 is an apparatus for a communication system having a user equipment (UE) device and/or a base station. The apparatus includes a means to obtain an arrangement configuration for a base station diversity transmission; a means to receive a base station diversity transmission from a base station; a means to obtain a phase tracking reference signal (PT-RS) from PT-RS resource elements (REs) of the base station diversity transmission; and a means to generate phase compensation based on the PT-RS.

Example 30 includes the subject matter of Example 29, including or omitting optional elements, wherein the arrangement utilizes a plurality of precoders for the PT-RS REs.

Example 31 includes the subject matter of any of Examples 29-30, including or omitting optional elements, wherein the arrangement uses double subcarrier spacing to mitigate the presence of orphaned REs.

Example 32 is an apparatus configured to be employed within a user equipment (UE) device. The apparatus comprises baseband circuitry which includes a radio frequency (RF) interface and one or more processors. The one or more processors are configured to arrange phase tracking reference signal (PT-RS) resource elements (REs) and data REs as an arrangement for a transmission based on one or more diversity factors. The one or more diversity factors include a time domain and a frequency domain. The one or more processors are also configured to provide the transmission having the PT-RS REs to the RF interface for transmission to a base station.

Example 33 includes the subject matter of Example 32, including or omitting optional elements, wherein the one or more diversity factors include one or more of symbols, subcarriers, transmitter antenna ports (APs), demodulation reference signal (DMRS) APs, pairing, and precoders.

Example 34 includes the subject matter of any of Examples 32-33, including or omitting optional elements, wherein the one or more processors are further configured to multiplex the PT-RS REs and the data REs using one of time division multiplexing (TDM) or frequency division multiplexing (FDM).

Example 35 includes the subject matter of any of Examples 32-34, including or omitting optional elements, wherein the transmission is a cyclic prefix-orthogonal frequency division multiplexing (CP-OFDM) waveform or a discrete Fourier transform spreading orthogonal frequency division multiplexing (DFT-s-OFDM) waveform.

Example 36 includes the subject matter of any of Examples 32-35, including or omitting optional elements, wherein the one or more processors are further configured to multiplex the PT-RS REs and the data REs using time division multiplexing (TDM) for one of space frequency block coding (SFBC), space time block coding (STBC) or beam/precoder cycling based transmission.

Example 37 includes the subject matter of any of Examples 32-36, including or omitting optional elements, wherein the PT-RS REs are transmitted using a plurality of demodulation reference signal (DMRS) antenna ports (APs).

Example 38 includes the subject matter of any of Examples 32-37, including or omitting optional elements, wherein the PT-RS REs are paired using data symbol pairing for SFBC or STBC.

Example 39 includes the subject matter of any of Examples 32-38, including or omitting optional elements, wherein the PT-RS REs are transmitted using a plurality of transmitter antenna ports (APs) and the number of transmitter APs is less than a number of demodulation reference signal (DMRS) APs.

Example 40 includes the subject matter of any of Examples 32-39, including or omitting optional elements, wherein the one or more processors are configured to arrange a sequence of the PT-RS REs based on one or more of an antenna port (AP) index, a symbol index, a slot index, a subframe index, a frame index, a cell identification (ID) and/or a virtual cell ID for PT-RS.

Example 41 includes the subject matter of any of Examples 32-40, including or omitting optional elements, wherein the virtual cell ID for PT-RS is predefined or configured by higher layer signaling and the virtual cell ID for PT-RS is varied from a virtual cell ID for a demodulation reference signal (DMRS).

Example 42 includes the subject matter of any of Examples 32-41, including or omitting optional elements, wherein the one or more processors are further configured to multiplex the PT-RS REs and the data REs using frequency division multiplexing (FDM) one of space frequency block coding (SFBC), space time block coding (STBC) or beam/precoder cycling based transmission.

Example 43 includes the subject matter of any of Examples 32-42, including or omitting optional elements, wherein the PT-RS REs are transmitted using a plurality of transmitter antenna ports (APs) and the number of transmitter APs is equal to a number of demodulation reference signal (DMRS) APs.

Example 44 includes the subject matter of any of Examples 32-43, including or omitting optional elements, wherein the one or more processors are configured to assign the PT-RS REs to a plurality of antenna ports (APs) and multiplex each of the PT-RS REs based on the assigned AP of the plurality of APs.

Example 45 includes the subject matter of any of Examples 32-44, including or omitting optional elements, wherein the PT-RS REs are precoded using one or more precoders, wherein the one or more precoders are configured by higher layer signaling, downlink control information (DCI), a symbol index, and/or a subcarrier index.

Example 46 includes the subject matter of any of Examples 32-45, including or omitting optional elements, wherein the transmission is a discrete Fourier transform spreading orthogonal frequency division multiplexing (DFT-s-OFDM) waveform and one or more of the data REs are punctured or reserved for PT-RS.

Example 47 includes the subject matter of any of Examples 32-46, including or omitting optional elements, wherein the one or more diversity factors include a precoder resource block group (PRG) size.

Example 48 includes the subject matter of any of Examples 32-47, including or omitting optional elements, wherein the PT-RS REs are arranged using orthogonal cover codes (OCC) based on different antenna ports (APs).

Example 49 includes the subject matter of any of Examples 32-48, including or omitting optional elements, wherein the base station is a gNB and the base station includes baseband circuitry having one or more processors configured to generate phase compensation based on the PT-RS and apply the generated phase compensation to the transmission to mitigate phase noise.

It is to be understood that aspects described herein can be implemented by hardware, software, firmware, or any combination thereof. When implemented in software, functions can be stored on or transmitted over as one or more instructions or code on a computer-readable medium. Computer-readable media includes both computer storage media and communication media including any medium that facilitates transfer of a computer program from one place to another. A storage media or a computer readable storage device can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or other tangible and/or non-transitory medium, that can be used to carry or store desired information or executable instructions. Also, any connection is properly termed a computer-readable medium. For example, if software is transmitted from a website, server, or other remote source using a coaxial cable, fiber optic cable, twisted pair, digital subscriber line (DSL), or wireless technologies such as infrared, radio, and microwave, then coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Various illustrative logics, logical blocks, modules, and circuits described in connection with aspects disclosed herein can be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform functions described herein. A general-purpose processor can be a microprocessor, but, in the alternative, processor can be any conventional processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration. Additionally, at least one processor can comprise one or more modules operable to perform one or more of the s and/or actions described herein.

For a software implementation, techniques described herein can be implemented with modules (e.g., procedures, functions, and so on) that perform functions described herein. Software codes can be stored in memory units and executed by processors. Memory unit can be implemented within processor or external to processor, in which case memory unit can be communicatively coupled to processor through various means as is known in the art. Further, at least one processor can include one or more modules operable to perform functions described herein.

Techniques described herein can be used for various wireless communication systems such as CDMA, TDMA, FDMA, OFDMA, SC-FDMA and other systems. The terms "system" and "network" are often used interchangeably. A CDMA system can implement a radio technology such as Universal Terrestrial Radio Access (UTRA), CDMA1800, etc. UTRA includes Wideband-CDMA (W-CDMA) and other variants of CDMA. Further, CDMA1800 covers IS-1800, IS-95 and IS-856 standards. A TDMA system can implement a radio technology such as Global System for Mobile Communications (GSM). An OFDMA system can implement a radio technology such as Evolved UTRA (E-UTRA), Ultra Mobile Broadband (UMB), IEEE 802.11 (Wi-Fi), IEEE 802.16 (WiMAX), IEEE 802.18, Flash-OFDM, etc. UTRA and E-UTRA are part of Universal Mobile Telecommunication System (UMTS). 3GPP Long Term Evolution (LTE) is a release of UMTS that uses E-UTRA, which employs OFDMA on downlink and SC-FDMA on uplink. UTRA, E-UTRA, UMTS, LTE and GSM are described in documents from an organization named "3rd Generation Partnership Project" (3GPP). Additionally, CDMA1800 and UMB are described in documents from an organization named "3rd Generation Partnership Project 2" (3GPP2). Further, such wireless communication systems can additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Single carrier frequency division multiple access (SC-FDMA), which utilizes single carrier modulation and frequency domain equalization is a technique that can be utilized with the disclosed aspects. SC-FDMA has similar performance and essentially a similar overall complexity as those of OFDMA system. SC-FDMA signal has lower peak-to-average power ratio (PAPR) because of its inherent single carrier structure. SC-FDMA can be utilized in uplink communications where lower PAPR can benefit a mobile terminal in terms of transmit power efficiency.

Moreover, various aspects or features described herein can be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data. Additionally, a computer program product can include a computer readable medium having one or more instructions or codes operable to cause a computer to perform functions described herein.

Communications media embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

Further, the actions of a method or algorithm described in connection with aspects disclosed herein can be embodied directly in hardware, in a software module executed by a processor, or a combination thereof. A software module can reside in RAM memory, flash memory, ROM memory, EPROM memory, EEPROM memory, registers, a hard disk, a removable disk, a CD-ROM, or any other form of storage medium known in the art. An exemplary storage medium can be coupled to processor, such that processor can read information from, and write information to, storage medium. In the alternative, storage medium can be integral to processor. Further, in some aspects, processor and storage medium can reside in an ASIC. Additionally, ASIC can reside in a user terminal. In the alternative, processor and storage medium can reside as discrete components in a user terminal. Additionally, in some aspects, the s and/or actions of a method or algorithm can reside as one or any combination or set of codes and/or instructions on a machine-readable medium and/or computer readable medium, which can be incorporated into a computer program product.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

In particular regard to the various functions performed by the above described components (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the disclosure. In addition, while a particular feature may have been disclosed with respect to only one of several implementations, such feature may be combined with one or more other features of the other implementations as may be desired and advantageous for any given or particular application.

What is claimed is:

1. An apparatus for a user equipment (UE) device, comprising baseband circuitry having:
    a radio frequency (RF) interface configured to receive a transmission from a base station; and
    one or more processors configured to:
        obtain one or more phase tracking reference signals (PT-RSs) from one or more PT-RS resource elements (REs) from the received transmission according to an arrangement, wherein the one or more PT-RSs are received from one or more transmitter antenna ports (APs);
        obtain a demodulation reference signal (DMRS) from the received transmission, wherein a PT-RS received from a respective AP is associated with a respective DMRS antenna port;
        process a received transmission based on the one or more PT-RS and the DMRS: and
        dynamically determine a presence of PT-RS in the received transmission from a modulation and coding scheme (MCS) and a bandwidth.

2. The apparatus of claim 1, wherein the arrangement is based on one or more diversity factors, wherein the one or more diversity factors include one or more of symbols, subcarriers, APs, DMRS APs, pairing, and precoders.

3. The apparatus of claim 1, wherein the PT-RS is received from a number of APs which is less than a number of DMRS APs.

4. The apparatus of claim 1, wherein the bandwidth is compared to a bandwidth threshold received from higher layers to dynamically determine the presence of PT-RS in the received transmission.

5. The apparatus of claim 1, wherein to process the received transmission the one or more processors are further configured to process a group of resource blocks of the received transmission using PT-RS received in PT-RS REs within the group of resource blocks.

6. The apparatus of claim 1, wherein the association of the PT-RS received from the respective AP with the respective DMRS antenna port is predefined in a specification.

7. The apparatus of claim 1, wherein the association of the PT-RS received from the respective AP with the respective DMRS antenna port is dynamically indicated in downlink control information.

8. The apparatus of claim 1, wherein a first PT-RS received from a first AP associated with a first respective DMRS AP is received on first REs, the first REs corresponding to first subcarriers, wherein a second PT-RS received from a second AP associated with a second DMRS AP is received on second REs, the second REs corresponding to second subcarriers, and wherein the first and second subcarriers are disjoint.

9. The apparatus of claim 1, wherein the PT-RS received from the AP associated with the respective DMRS antenna port is received on first REs using a PT-RS sequence, wherein the PT-RS sequence is based on a DMRS sequence of the DMRS received from the respective DMRS antenna port.

10. An apparatus for a base station, comprising baseband circuitry having:
    a radio frequency (RF) interface configured to receive a transmission from a user equipment device, and one or more processors configured to:
- obtain one or more phase tracking reference signals (PT-RSs) from one or more PT-RS resource elements (REs) from the received transmission according to an arrangement, wherein the one or more PT-RSs are received from one or more transmitter antenna ports (APs);
- obtain a demodulation reference signal (DMRS) from the received transmission, wherein a PT-RS received from a respective AP is associated with a respective DMRS AP;
- process a received transmission based on the one or more PT-RS and the DMRS: and
- dynamically determine a presence of PT-RS in the received transmission from a modulation and coding scheme (MCS) and a bandwidth.

11. The apparatus of claim 10, wherein the arrangement based on one or more diversity factors, wherein the one or more diversity factors include one or more of symbols, subcarriers, APs, DMRS APs, pairing, and precoders.

12. The apparatus of claim 10, wherein the PT-RS is received from a number of APs which is less than a number of DMRS APs.

13. The apparatus of claim 10, wherein the bandwidth is compared to a bandwidth threshold received from higher layers to dynamically determine the presence of PT-RS in the received transmission.

14. The apparatus of claim 10, wherein to process the received transmission the one or more processors are further configured to process a group of resource blocks of the received transmission using PT-RS received in PT-RS REs within the group of resource blocks.

15. The apparatus of claim 10, wherein the association of the PT-RS received from the respective AP with the respective DMRS AP is predefined in a specification.

16. The apparatus of claim 10, wherein the association of the PT-RS received from the respective AP with the respective DMRS AP is dynamically indicated in uplink control information.

17. The apparatus of claim 10, wherein a first PT-RS received from a first AP associated with a first respective DMRS AP is received on first REs, the first REs corresponding to first subcarriers, wherein a second PT-RS received from a second AP associated with a second DMRS AP is received on second REs, the second REs corresponding to second subcarriers, and wherein the first and second subcarriers are disjoint.

18. The apparatus of claim 10, wherein the PT-RS received from the AP associated with the respective DMRS AP is received on first REs using a PT-RS sequence, wherein the PT-RS sequence is based on a DMRS sequence of the DMRS received from the respective DMRS AP.

* * * * *